US012695604B2

(12) United States Patent
Fletcher

(10) Patent No.: US 12,695,604 B2
(45) Date of Patent: Jul. 28, 2026

(54) METHODS AND SYSTEMS FOR BLOCKCHAIN-IMPLEMENTED EVENT-LOCK ENCRYPTION

(71) Applicant: nChain Licensing AG, Zug (CH)

(72) Inventor: John Fletcher, Cambridge (GB)

(73) Assignee: NCHAIN LICENSING AG, Zug (CH)

( * ) Notice: Subject to any disclaimer, the term of this patent is extended or adjusted under 35 U.S.C. 154(b) by 78 days.

(21) Appl. No.: 18/940,611

(22) Filed: Nov. 7, 2024

(65) Prior Publication Data

US 2025/0132903 A1 Apr. 24, 2025

Related U.S. Application Data

(63) Continuation of application No. 18/241,537, filed on Sep. 1, 2023, now Pat. No. 12,192,338, which is a (Continued)

(30) Foreign Application Priority Data

Jul. 24, 2017 (GB) ..................................... 1711878

(51) Int. Cl.
  *H04L 29/06* (2006.01)
  *H04L 9/08* (2006.01)
  (Continued)

(52) U.S. Cl.
  CPC .......... *H04L 9/0847* (2013.01); *H04L 9/0825* (2013.01); *H04L 9/085* (2013.01); (Continued)

(58) Field of Classification Search
  None
  See application file for complete search history.

(56) References Cited

U.S. PATENT DOCUMENTS

| | | | |
|---|---|---|---|
| 7,194,628 B1 * | 3/2007 | Guthery | H04L 9/085 |
| | | | 713/168 |
| 8,638,926 B2 * | 1/2014 | Schneider | H04L 9/085 |
| | | | 380/28 |

(Continued)

OTHER PUBLICATIONS

JPOA: Office Action issued Jan. 27, 2026 for corresponding JP 2025-036060.

*Primary Examiner* — Maung T Lwin
(74) *Attorney, Agent, or Firm* — Tarolli, Sundheim, Covell & Tummino LLP

(57) ABSTRACT

A computer-implemented method includes encrypting a plaintext message to a cryptographic public key in accordance with an identity-based encryption scheme using at least a congress public key to generate an encrypted message, wherein the congress public key is associated with members of a congress, respective members of the congress having access to private key shares usable in a threshold decryption scheme in which at least a threshold of private key shares are sufficient to derive a decryption key through the combination of partial contributions to the decryption key on behalf of the congress, generating, using at least a cryptographic private key corresponding to the cryptographic public key, a digital signature over a first set of instructions to perform cryptographic operations upon an occurrence of an event; and broadcasting one or more transactions to a proof-of-work blockchain network, the one or more transactions comprising the encrypted message, the cryptographic public key.

20 Claims, 16 Drawing Sheets

600

Related U.S. Application Data continuation of application No. 17/508,946, filed on Oct. 22, 2021, now Pat. No. 11,799,637, which is a continuation of application No. 16/633,556, filed as application No. PCT/IB2018/055236 on Jul. 16, 2018, now Pat. No. 11,159,313.

(51) Int. Cl.

| | |
|---|---|
| *H04L 9/30* | (2006.01) |
| *H04L 9/32* | (2006.01) |
| *H04L 9/00* | (2022.01) |

(52) U.S. Cl.
CPC .......... *H04L 9/3073* (2013.01); *H04L 9/3297* (2013.01); *H04L 9/50* (2022.05)

(56)                    References Cited

U.S. PATENT DOCUMENTS

| | | | | |
|---|---|---|---|---|
| 9,449,177 | B1 * | 9/2016 | El Defrawy ............ | G06F 21/60 |
| 10,505,723 | B1 * | 12/2019 | Griffin .................... | H04L 9/085 |
| 2013/0191632 | A1 * | 7/2013 | Spector .................. | H04L 9/085 |
| | | | | 713/155 |
| 2017/0338957 | A1 * | 11/2017 | Ateniese .............. | H04L 9/3242 |

* cited by examiner

300

400

500

600

700

800

Receive Withdrawal Request ⌐ 802

Evaluate Withdrawal Request ⌐ 804

Facilitate Withdrawal ⌐ 806

1000

Issue Request — 1002

Detect Proposal — 1004

Construct Transaction — 1006

Obtain Solution — 1008

1200

1300

Join Congress — 1302

Detect A Challenge — 1304

Deploy Ghost Chain — 1306

Distribute Digital Assets — 1308

Terminate Ghost Chain — 1310

1500

Obtain Cryptographic Public Key And Corresponding Cryptographic Private Key — 1502

Encrypt Message To The Public Key In Accordance With An Identity-Based Encryption Scheme — 1504

Generate A Digital Signature Over An Event Using The Cryptographic Private Key — 1506

Submit Transaction With Encrypted Message, Public Key, Signed Event, Instructions, And Fee — 1508

1600

METHODS AND SYSTEMS FOR BLOCKCHAIN-IMPLEMENTED EVENT-LOCK ENCRYPTION

CROSS-REFERENCE TO RELATED APPLICATION

This application is a continuation of U.S. patent application Ser. No. 18/241,537, filed Sep. 1, 2023, entitled "METHODS AND SYSTEMS FOR BLOCKCHAIN-IMPLEMENTED EVENT-LOCK ENCRYPTION," which is a continuation of U.S. patent application Ser. No. 17/508,946, filed Oct. 22, 2021, now U.S. Pat. No. 11,799,637, entitled "METHODS AND SYSTEMS FOR BLOCK-CHAIN-IMPLEMENTED EVENT-LOCK ENCRYP-TION," which is a continuation of U.S. patent application Ser. No. 16/633,556, filed on Jan. 23, 2020, now U.S. Pat. No. 11,159,313, entitled "METHODS AND SYSTEMS FOR BLOCKCHAIN-IMPLEMENTED EVENT-LOCK ENCRYPTION," which is a 371 National Stage Patent Application of International Patent Application No. PCT/IB2018/055236, filed Jul. 16, 2018, which claims priority to United Kingdom Patent Application No. 1711878.7, filed Jul. 24, 2017, the disclosures of which are incorporated herein by reference in their entirety.

BACKGROUND

This invention relates generally to distributed systems, and more particularly to methods and systems for event-locked operations in transactions on distributed systems. Event-locking and event-lock encryption may refer to performing operations on data in response to the occurrence of an event—for example, under an event-lock encryption scheme, a ciphertext message may be decrypted in response to the occurrence of an event. A particular type of event-lock encryption is a time-lock encryption scheme in which a message is encrypted and then, after an amount of time has passed, the encrypted message is decrypted or made decryptable. The invention is particularly suited, but not limited to, efficiently and reliably generating messages, detecting the occurrence of an event and performing operations in response to verifying the occurrence of the event using distributed systems. For example, a message may be encrypted under a time-lock encryption scheme where a corresponding decryption operation may occur as a result of the passage of a (possibly random) amount of time.

SUMMARY

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not purely limited to payments denominated in cryptocurrency. Such solutions would be able to harness the benefits of the blockchain (e.g., a permanent, tamper proof records of events, distributed processing, etc.) while being more versatile in their applications.

As blockchain technology is extended to provide new features, it is important that security of the blockchain and the digital assets represented therein be maintained. Extended feature sets that rely on the blockchain can be subject to attack from malicious parties. It can be useful, therefore, to provide methods and devices which offer additional security to the blockchain or new features of the blockchain or which control the ownership over digital assets to maintain the integrity of the blockchain.

Further, as new improvements or modifications to the blockchain are developed, it is helpful to have techniques for controlling and transferring digital assets from one blockchain to another while maintaining the integrity of both blockchains. Thus, it is desirable to provide improved methods and devices which improve blockchain technology in one or more of these aspects.

Thus, in accordance with the present invention there is provided a method/system as defined in the appended claims.

As will be described in greater detail below, a congress may be formed on a blockchain network. A congress is an open-membership group which may be joined by any node in the blockchain network upon submission of sufficient stake to a pool associated with the congress. For example, a node may join a congress through transfer of a digital asset, such as digital currency (such as bitcoin), tokens or other stake or value, to a resource (e.g., an account) associated with the congress. The congress may be secured, in part, through distributed generation of private key shares. Each private key share may be used by its holder to generate a partial signature for a transaction. A threshold signature scheme may be used to generate a valid signature for such a transaction using at least a threshold of partial signatures. The member deposit is subject to confiscation for malicious behaviour.

Advantageously, through the use of distributed generation of key shares and other security features, key shares are secured to prevent malicious activity by group members or non-group members. Such security, coupled with the use of a threshold signature scheme, allows a self-governing, decentralized group to be formed and the group may be used for any one of a number of purposes including, for example, to provide a two-way peg. More particularly, the threshold signature scheme allows the group to control digital assets encumbered by a public key associated with the group.

Therefore, in accordance with the invention there may be provided a computer-implemented method. The computer-implemented method may include: i) encrypting a plaintext message to a cryptographic public key in accordance with an identity-based encryption scheme using at least a congress public key to generate an encrypted message, wherein the congress public key is associated with members of a congress, respective members of the congress having access to private key shares usable in a threshold decryption scheme in which at least a threshold of private key shares are sufficient to derive a decryption key through the combination of partial contributions to the decryption key on behalf of the congress; ii) generating, using at least a cryptographic private key corresponding to the cryptographic public key, a digital signature over a first set of instructions to perform cryptographic operations upon an occurrence of an event; and iii) broadcasting one or more transactions to a proof-of-work blockchain network, the one or more transactions comprising the encrypted message, the cryptographic public key, at least the first set of instructions, and a second set of instructions to the members of the congress to cooperate to: in response to reaching a consensus on the event occurring and contingent upon the digital signature being authentic, deploy a ghost chain to perform the first set of instructions, wherein performing the first set of instructions includes at least deriving the decryption key from the cryptographic key and a plurality of private key shares that satisfies the threshold, the decryption key being sufficient cryptographic material to obtain the plaintext message from the encrypted message.

In some implementations, the decryption key is derivable based at least in part on a scheme based on pairings on elliptic curves.

In some implementations, the identity-based encryption scheme is in accordance with a Boneh-Franklin identity-based encryption scheme.

In some implementations, the one or more transactions comprise a transaction that includes a fee to the public group address associated with the congress, the fee being distributed to at least some of the miners of the ghost chain that cooperate to derive the decryption key.

In some implementations, the miners of the ghost chain reach the consensus on the event based on information obtainable from the proof-of-work blockchain.

In some implementations, the information obtainable from the proof-of-work blockchain is a timestamp of a transaction submission to the proof-of-work blockchain.

In some implementations, the information obtainable from the proof-of-work blockchain is a detection of a valid block of at least a particular height.

In some implementations, the consensus is reached based at least in part on detecting that the members of the congress emit at least a threshold of attestations that the event has occurred, wherein occurrence of the event is determined based at least in part on information outside of the proof-of-work blockchain, and further wherein authenticity of the attestations are cryptographically verifiable using cryptographic public keys associated with respective members of the congress.

In some implementations, the attestations are emitted for a predetermined duration.

In some implementations, the one or more cryptographic operations includes one or more decryption operations.

In some implementations, the one or more cryptographic operations includes one or more authentication operations.

In some embodiments, a respective private key share of a member of the congress is generated and used to perform cryptographic operations within a trusted execution environment within a node associated with the member.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Blockchain Network

Figure 1:
FIG. 1 illustrates a block diagram of an example blockchain network.
Figure 1:
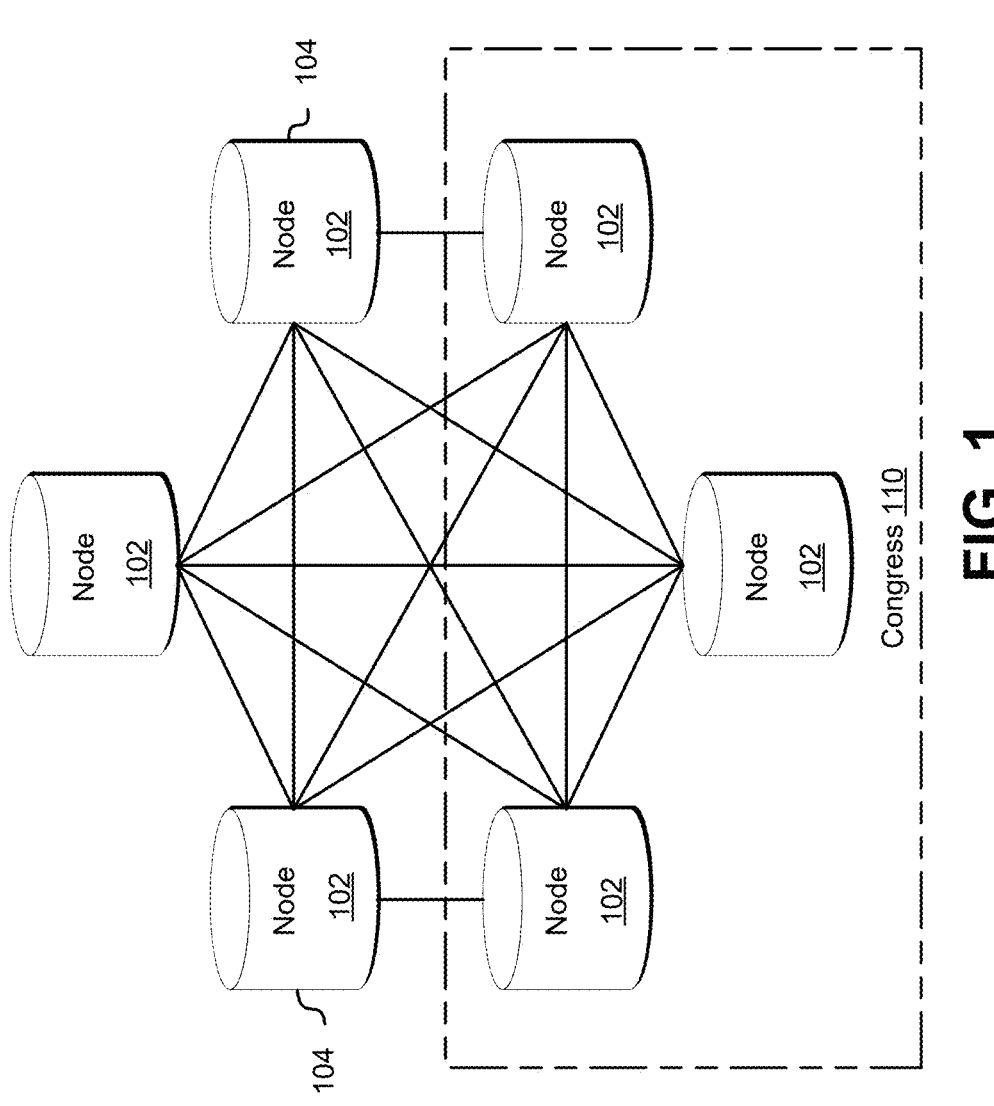

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with SHA-256, to a number that is less than a value defined by the current difficulty. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may not operate as miners and may, instead, participate as validating nodes. Validation of transactions may involve checking signature(s), confirming reference to valid UTXO, etc.

The example of FIG. 1 includes five nodes 102, three of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 is an open-membership group which may be joined by any nodes 102 upon submission of sufficient stake to a pool associated with the congress 110. For example, a node may join a congress through transfer of a digital asset, such as digital currency (such as bitcoin), tokens or other stake or value, to an account associated with the congress 110. A node 102 joining a congress may be any node in the blockchain network including both mining and non-mining nodes. In at least some applications of a congress (such as when the congress is performing a two-way peg as described below), a node acting as a congress member monitors the blockchain in the sense that they download (but not necessarily retain) the full blockchain.

Techniques for joining, leaving and participating in a congress 110 will be discussed in greater detail below.

Electronic Device Operating as A Node

Figure 2:
FIG. 2 illustrates a block diagram of an example electronic device which may function as a node in a blockchain network.
Figure 2:
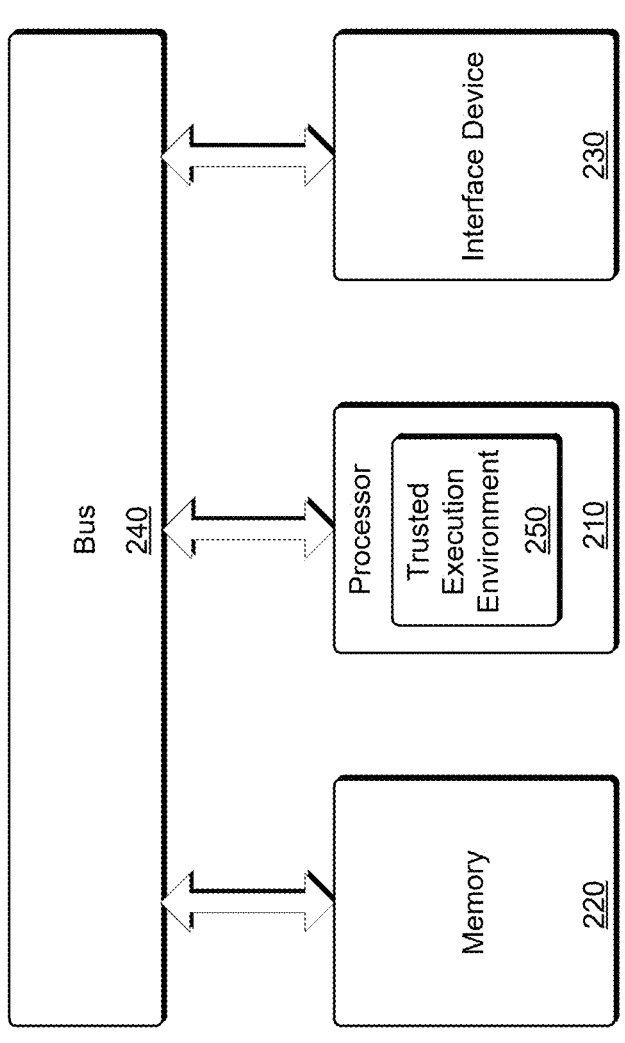

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such as a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

The TEE 250 may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node 102 (FIG. 1) to prove to other nodes 102 that a TEE 250 is authentic and is running approved computer executable instructions for a protocol that is implemented by a congress 110. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 110 who has previously used the private key share on the electronic device 200 has chosen to leave the congress. The electronic device 200 may provide attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

The electronic device 200 acts as a node 102 (FIG. 1) in the blockchain network 100 (FIG. 1) and may join and otherwise take part in a congress 110 (FIG. 1). A congress 110 is formed when a group of digital asset bearers pool digital assets, such as digital currency, tokens or other stake or value supported by the blockchain network 100 (FIG. 1).

Congresses and Threshold Signatures

The congress 110 may be a permissioned or non-permissioned group. That is, the congress 110 may be joined by any node 102 (FIG. 1) in the blockchain network 100 (FIG. 1) (i.e., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares. The number of shares held may be in proportion to the amount deposited in the pool.

The digital assets that are controlled by the congress 110, which include any digital assets transferred to the congress address, are placed under the control of a threshold signature scheme. Under the threshold signature scheme, a group of members whose total private key share holdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited for reasons other than obtaining private key shares. Non-members or members may deposit digital assets to the address associated with the congress for various reasons.

Since the same congress public key may control both member deposits (i.e., digital assets provided by congress members in return for private key shares) and digital assets provided by members or non-members for other purposes, at least some deposits sent to the address associated with the congress may be specially flagged to indicate the type of deposit. For example, a transaction that transfers the digital asset to the congress address may include a flag, identifier or other attribute which indicates the nature of the deposit being made. By way of example, a transaction that transfers the digital asset to the congress address that is not made for the purpose of joining a congress or boosting a stake in congress membership may include a special identifier to indicate that the deposit is being made for another purpose. Such identifiers may be used by nodes 102 associated with the congress 110 when managing private key generation. More particularly, nodes 102 which deposit digital assets for the purpose of joining the group are allocated private key shares for the congress 110 (as a result of making the deposit of digital assets) while other nodes 102 which deposited digital assets for other purposes (e.g., to transfer to a sidechain) may not hold congress private key shares for the congress (i.e., corresponding to the congress public key).

The congress 110 may act as a self-governing group in which cooperative behaviour is enforced through the threat of confiscation of all or part of the member deposit. Non-cooperative or malicious members may have such digital assets confiscated by participation in a cooperative protocol by a number of honest members. That is, to ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (e.g., if a consensus has been reached (on an alt-chain) that they should not be returned), transferred immediately or in the future to another unspendable address, or otherwise confiscated and the nature of confiscation may depend on whether the congress functions as a bonded validator set for a sidechain.

Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by members of the group (i.e., the congress) to approve the withdrawal.

The threshold signature scheme implemented by the congress 110 may be of various types. The threshold signature scheme allows sharing of signing power between n parties as long as at least a threshold number of private key shares have contributed towards generating a valid signature. Any subset smaller than the threshold cannot generate a valid signature. More particularly, each of the parties controls a share of a private signing key and a threshold number of key shares must be used to generate a valid signature through the combining of partial signatures. Any subset of key shares that is less than the threshold cannot generate a valid signature.

The threshold signature scheme may be an Elliptic Curve Digital Signature Algorithm (ECDSA) scheme. For example, an ECDSA scheme may be of the type proposed by Ibrahim, et al., in "A robust threshold elliptic curve digital signature providing a new verifiable secret sharing scheme", 2003 EIII 46th Midwest Symposium on Circuits and Systems, 1:276-280 (2003). This threshold signature scheme is an extension of a digital signature scheme which is an elliptic curve cryptography based algorithm in which t+1 key shares from a party of n key share holders are required to reconstruct a private key. The scheme may be used to construct a valid signature without having to reconstruct a private key and without any party having to reveal their key share to another party.

Since t+1 key shares are sufficient to reconstruct the secret, the maximum number of permissible adversaries according to this technique is t. An adversary, in the model of Ibrahim et al., is an entity who has corrupted a party holding a secret share and has access to that secret share. Adversaries can be of various types. For example, a Byzantine adversary is an adversary who may pretend to participate in a protocol while they may, in fact, sending incorrect information. The ECDSA scheme proposed by Ibrahim is robust against up to t<=n/4 malicious adversaries. This robustness could rise to t<=n/3, but at the cost of greater complexity.

The ECDSA scheme of Ibrahim et al. is robust against halting t<=n/3 halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of Publically Verifiable Secret Sharing (PVSS). Such techniques may avoid a possible delay in the identification of a cheating sender which might occur where PVSS is not used and a recipient of an incorrect share is offline or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may burn the digital currency, tokens, stake or value by transferring them to an unspendable address or the congress may confiscate such digital assets by coming to a consensus with other nodes to refuse. The nodes 102 that are not a misbehaving node may also deter misbehavior by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against 2t corrupted nodes. Because a signature can be produced if $n-2t>=2t+1$, any qualified subset of key shares of size $2t+1<=(n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSA/ECDSA threshold signature scheme", (2015). This protocol allows t+1 parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of t+1 players out of n. Thus, for large values of both n and t, a large number of key shares will need to be stored. To mitigate such storage requirements, standard bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen, et al., *Efficient Multiparty Protocols via Log-Depth Threshold Formulae* (2013), Advances in Cryptology—CRYPTO 2013, pp 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 300, 400, 500, 600, 700, 800, 1000 of FIGS. 4 to 8 and 10. Thus, the congress protocol may include one or more of the methods 300, 400, 500, 600, 700, 800, 1000 of FIGS. 4 to 8 and 10. The methods may be performed by a node cooperatively with other nodes associated with other congress members.

Congress Initiation

Figure 3:
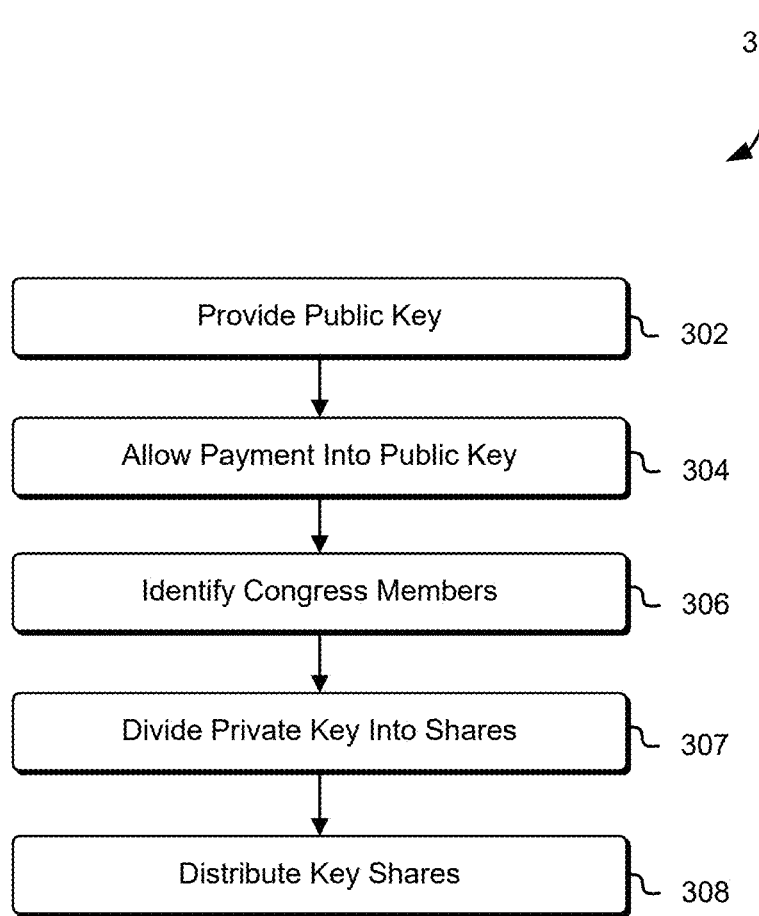
FIG. 3 is a flowchart of an example method of initiating a congress.

Referring now to FIG. 3, a method 300 of initiating a congress 110 is illustrated. The method 300 may be performed by an initially trusted party to set up the congress 110. That is a node 102 associated with the initially trusted party may perform the method 300.

The method 300 includes, at operation 302, providing a congress public key. The congress public key may be provided to other nodes 102 to allow the other nodes to pay into the congress public key if they wish to join the congress. That is, others may transfer digital assets to an address associated with the congress public key in order to join the congress.

The node 102 performing the method 300, at operation 304, allows payment into the public key until one or more conditions are satisfied. For example, the node may allow payment into the public key for a determined period of time or for a determined number of blocks. After the condition is satisfied (e.g., after expiration of this period of time or mining of the number of blocks), the node 102 performing the method 300 identifies, at operation 306, initial members of the congress.

After the parties who will comprise the initial membership of the congress are identified, a private key is divided into private key shares according to a threshold signature scheme at operation 307. The private key shares are then distributed, at operation 308, from the node 102 performing the method 300 to the identified parties. The private key shares are associated with a threshold signature scheme, which may be of the type described herein.

During operation 308, the nodes 102 that are identified as congress members cooperate to generate new private key shares and a new public key. The original key shares that were sent to such nodes by the initially trusted party may be used to sign and broadcast a transaction to send all digital assets in the congress pool to the new public key, which then becomes the congress public key. That is, during operation 408, a new group public address is established and the digital assets under control of the congress are transferred to this new address, which becomes the new address for the group and which is associated with the congress public key. After this transfer is confirmed, the congress can operate trustlessly. The new group public address is formed into which deposits of digital assets may be received in the future from other nodes wishing to join the congress 110, or for other purposes as described above. The congress members are now considered to be enrolled in the congress and these nodes can now operate without the aid of the initially trusted party. Moreover, the initially trusted party no longer plays any part in the operation of the congress.

Joining a Congress After the Congress Has Been Initiated

Figure 4:
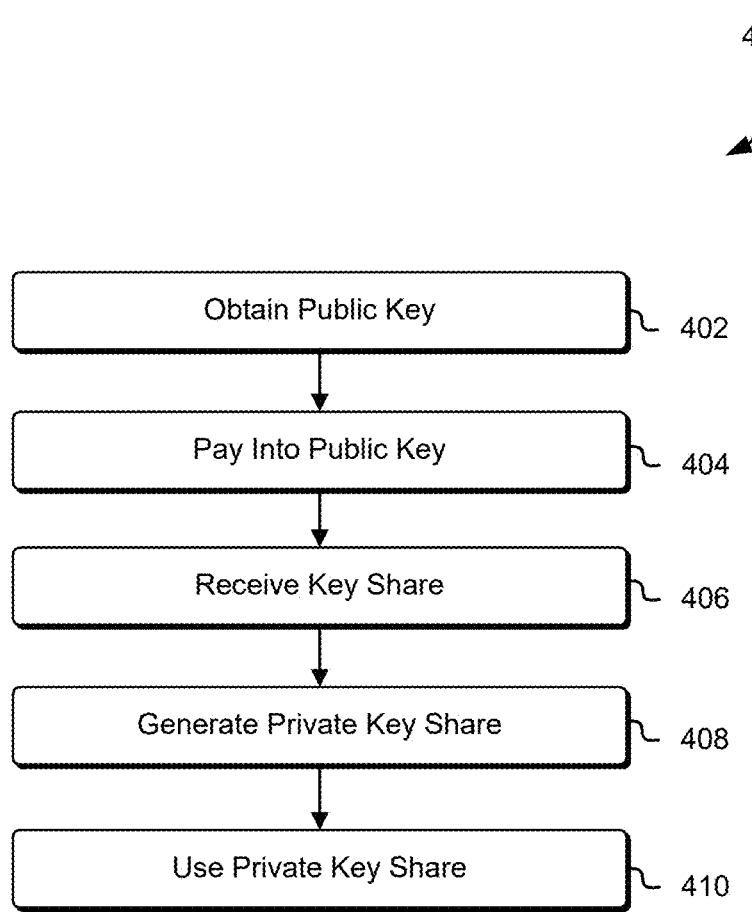
FIG. 4 is a flowchart of an example method of joining a congress.

Reference will now be made to FIG. 4 which illustrates a method 400 of joining a congress. The method 400 of FIG. 4 may operate in conjunction with the method 300 of FIG. 3, but the method 400 of FIG. 4 is performed by a different one of the nodes 102 operating in the same blockchain network 100 (FIG. 1) in which the node performing the method 300 of FIG. 3 operates. The method 400 of FIG. 4 includes, at operation 402, obtaining a congress public key.

The congress public key may be obtained directly from the party initiating the congress, such as the node performing the method 300 of FIG. 3, or it may be obtained from a third party including, for example, a third party system operating outside of the blockchain network 100 (FIG. 1). For example, the congress public key may be obtained from a public web server accessible over the public Internet.

The node 102 performing the method 400 pays into the congress public key at operation 404 by broadcasting a transaction of digital assets from a private account associated with the node 102 to a congress address (i.e., an address associated with the congress public key). More particularly, the node 102 broadcasts a transaction to transfer one or more digital assets to a public group address that is associated with the congress public key. The public group address is the address for a congress pool. The congress pool includes other digital assets associated with the other members of a congress. Thus the transaction at operation 404, once added to a block by a miner 104 (FIG. 1), transfers the digital asset to the congress pool which includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress.

The transaction at operation 404 may include a flag, identifier or other attribute which indicates that the party transferring the digital asset wishes to join the congress and that the deposit is being made for such purpose.

After depositing the digital assets with the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at operation 408, the existing congress members may cooperate to update the key shares. For example, a node 102 may generate a random polynomial of order t and with the constant term zero $$f_{n+1}^0(x).$$

The node 102 may then calculate the point $$f_{n+1}^0(n+1)$$

and set this as their private key share. The node 102 may then distribute the points on this polynomial $$f_{n+1}^0(i)$$

to each of the existing congress members, i=1, . . . , n. Each existing congress member (i=1, . . . , n) then adds the received value to their existing private key share to obtain the new private key share. The node 102 now has a private key share equivalent to all other members and the corresponding public key remains unchanged.

As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250.

After the private key share is generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the digital assets to be transferred away from the congress. The node 102 performing the method 400 may retrieve the private key share from storage and use the private key share in order to contribute towards signature generation. If a sufficient number of other congress members also use their respective private key to contribute towards signature generation, the signature is generated and a valid outgoing transaction may be broadcast. When a miner 104 (FIG. 1) of the blockchain network 100 adds the transaction to a mined block which is added to the blockchain by consensus of the nodes 102 in the blockchain network 100 and the block is confirmed, the outgoing transaction is complete. At this point, the digital assets represented in the transaction may no longer be under the control of the congress. That is, such digital assets may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that it cannot retain a copy of the private key if the member wants their deposit back and receive their deposit back since it must attest to the deletion of the private key before the member deposit is returned.

The method 400 of FIG. 4 may be performed during or after the initial setup phase. That is, the method 400 may be performed before the initial key shares are distributed (e.g., during operation 308 of the method 300 of FIG. 3) or afterward (e.g., during rebalancing, which will be discussed in greater detail below).

The transaction at operation 410 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to an unspendable address.

Confiscation of Digital Asset

Figure 5:
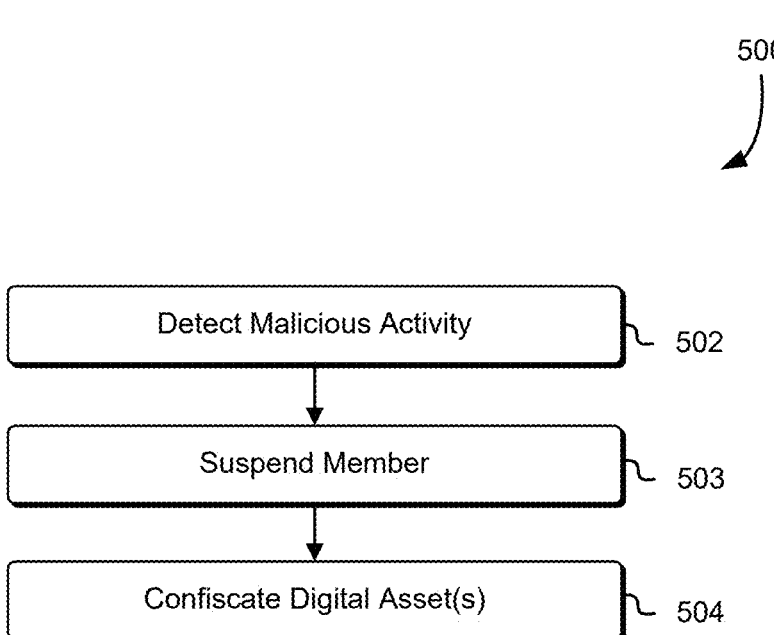
FIG. 5 is a flowchart of an example method of confiscating a digital asset.

Referring now to FIG. 5, an example method 500 of confiscating a digital asset is illustrated. The method 500 of FIG. 5 may be performed by a node 102, which may be the same node performing the method 400 of FIG. 4. The method 500 may be performed after operation 408 of the method 400 of FIG. 4 so that the node 102 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent or otherwise unacceptable information) to other members of the congress, the member may be deemed to be a malicious member.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (in response to a consensus that that this action should be taken), transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction (which is a transaction that transfers digital assets to an unspendable address or to another node as a reward for exposing malicious activity). That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share is utilized to contribute to the authorization of a transaction of one or more digital assets that are associated with that group member and that are held in the congress pool.

Since a threshold signature scheme is used with the congress public key, an individual node acting alone cannot transfer another congress member's deposit of digital assets away from the congress pool (e.g., to an unspendable address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at operation 503), which causes any withdrawal request from the suspended member to be automatically ignored. When digital assets are confiscated by transfer, the other address to which the digital asset(s) may be transferred may be associated with an unspendable address. For example, the other address may be an address for which no private key exists so that no party can access the digital assets bound by the public key for the address. When a transaction that transfers digital assets to the unspendable address is confirmed or when consensus is reached on a sidechain that digital assets should be confiscated, the digital assets may be considered to have been burned, since they are no longer spendable by any members of the congress or indeed by any nodes in the blockchain network 100.

Accordingly, at operation 504, the node may confiscate the digital asset by using the private key share in cooperation with other members of the congress to generate a valid signature for the transaction to the unspendable address and in some implementations may involve achieving consensus, on a second blockchain, that a member should be permanently deprived of all or part of their deposit.

Further, in some implementations, a congress may serve as a bonded validator set, securing a proof-of-stake sidechain, and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member deposit, made by the malicious member, will be denied and the deposit is considered to be confiscated. The confiscated digital assets may be burnt at some time in the future. That is, at some time later, a threshold of members (not including the malicious member) may collaborate to authorize transfer of the confiscated digital assets to an unspendable address.

Figure 6:
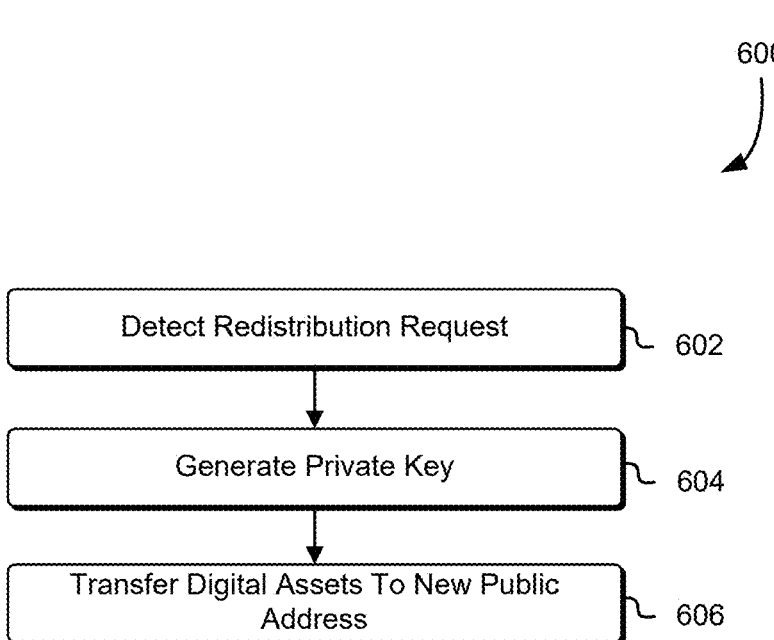
FIG. 6 is a flowchart of an example method of redistributing key shares.

Since the congress is an open group which may be joined by any node 102 of the blockchain network 100 through deposit of digital assets, the group membership may periodically change. When such changes occur, the private key share distributions may be updated. Referring now to FIG. 6, an example method 600 of updating private key share distributions is illustrated. The method 600 may be performed by a node 102 of the blockchain network 100 in cooperation with other nodes of the blockchain network 100. Updating Private Key Share Distributions Using New Public Address At operation 602 of the method 600, the node 102 detects a redistribution request, which is a request, the fulfilment of which entails a redistribution of key shares. For example, the node 102 may detect that a prospective new member has transferred digital assets into the public group address or that an existing member has requested withdrawal of a member deposit Digital assets may be transferred to the public group address by nodes requesting to join the congress or increase their participation in the congress and by other nodes who are not requesting to join the congress but are instead transferring the digital assets to the congress for another purpose (such as to transfer the digital assets to a sidechain, as will be described below). At operation 602, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfilment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated a private key share for use with the new congress public key, they lose the capacity to take part in the congress and are no longer considered congress members.

Further, in response to detecting a redistribution request (which is a request, the fulfilment of which, entails the redistribution of key shares), at operation 606, the node 102 collaborates with other congress members to transfer all digital assets in the public group address to a new public address associated with a new public key (which will then become the new congress public key).

Thus, according to the method 600 of FIG. 6, when the distribution of deposits changes or when a request is received from a member to withdraw a deposit, private key shares may be regenerated and all of the digital assets under control of the congress may be moved to a new public key. The frequency with which memberships of a congress can be updated is limited by the block time of the blockchain network 100. Many applications may only require rebalancing at low frequencies relative to the average block generation time of the proof-of-work mainchain.

Figure 7:
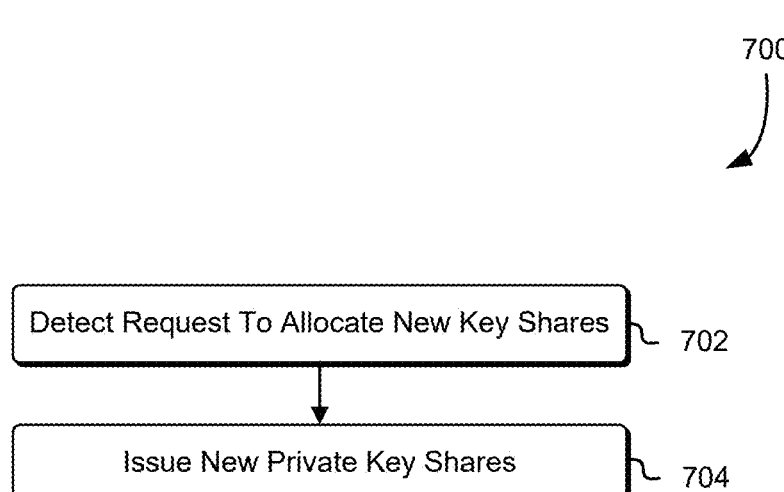
FIG. 7 is a flowchart of a further example method of redistributing key shares.

Updating Private Key Share Distributions While Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time the distribution of member deposits changes. When a request to allocate a new key share is detected (at operation 702, which may occur through deposit of digital assets to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 704, an additional key share may be allocated while other key shares are renewed. Such renewal is required to be accompanied by the attestation to deletion of any key shares of the previous generation. In this case, new shares may be allocated while maintaining the same threshold (in the context of SSS, this involves sharing on a new polynomial, of increased order).

At operation 702, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set up phase of the congress. Computations associated with the set up protocol are performed within the TEE enclaves so that no member or former member can derive any information about their own or others private key shares from inter-member communication or any other method. The enclaves within the TEEs enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave attests to the deletion of a key share. Each node 102 may interpret such an attestation as a confirmation that the required deletion has occurred on other nodes through the remote attestation protocol. Thus, the method 700 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

Figure 8:
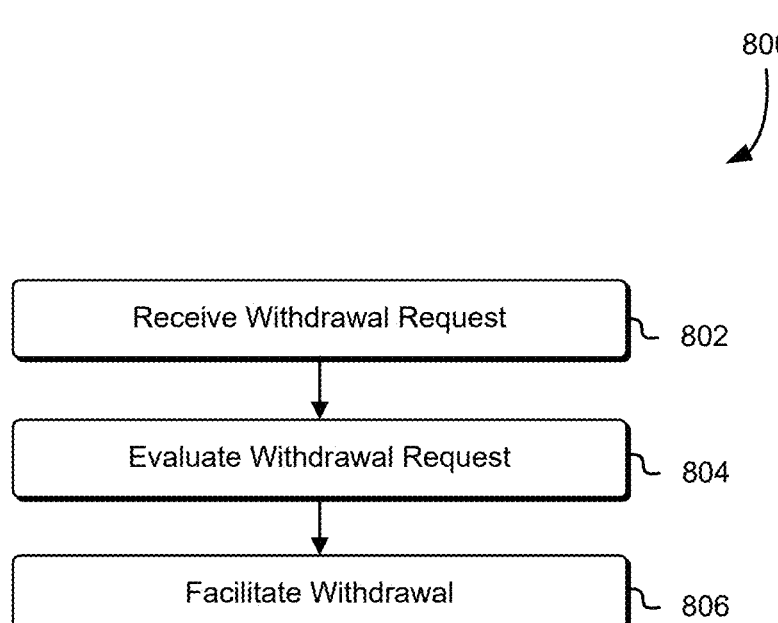
FIG. 8 is a flowchart of an example method of returning a deposit.

The method 700 of FIG. 7 avoids having to relock digital assets under a new congress public key each time the membership changes. Further, in some circumstances the method 700 may update membership faster than the method 600 of FIG. 6 since, under the method 700 of FIG. 7 a transaction does not need to be added to the blockchain to move all digital assets to a new public key because digital assets are not moved to a new public key. That is, the membership may be updated using the method 700 of FIG. 7 without having to wait for several blocks to be generated to confirm transfer of the digital assets to the new public key since the public key does not change Disenrollment from Congress As noted above, group members may occasionally request to leave the congress and, when a group member disenrolls from a congress, the digital assets that they deposited to the congress pool may be returned to them. Referring now to FIG. 8, an example method 800 of returning a deposit is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw digital assets previously deposited by the requestor and currently controlled by the congress. The request may have been broadcast, by the requestor to all congress members.

In response to receiving the request, the node 102, at operation 804, evaluates the request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress key may be used and other digital assets under congress control may be transferred to the new congress key.

If the node 102 approves the withdrawal request based on the evaluation, at operation 806 the node facilitates withdrawal of the digital assets. That is, the node 102 uses its private key share to cooperatively generate a digital signature and uses the digital signature to transfer the digital assets previously deposited by the requestor back to the requestor. For example, the digital assets may be sent back to the address from which they were previously received. Operation 806 is performed in accordance with the threshold signature scheme so that the withdrawal is only effected if at least the threshold number of congress members authorize the withdrawal.

Operation 806 is performed after the member who desires to disenrol is suspended from activity for a period of time. This waiting period prevents the member from engaging in misbehavior while the protocol for return of their member deposit is being performed.

The congress protocol may be used for a number of different purposes. The congress provides a secure mechanism for performing various functions. The congress may operate trustlessly and provides control of ownership over a digital asset.

The congress protocol may, for example, be used to implement a ghost chain, in which case, the congress protocol may be referred to as a ghost chain protocol.

Ghost Chains

Figure 9:
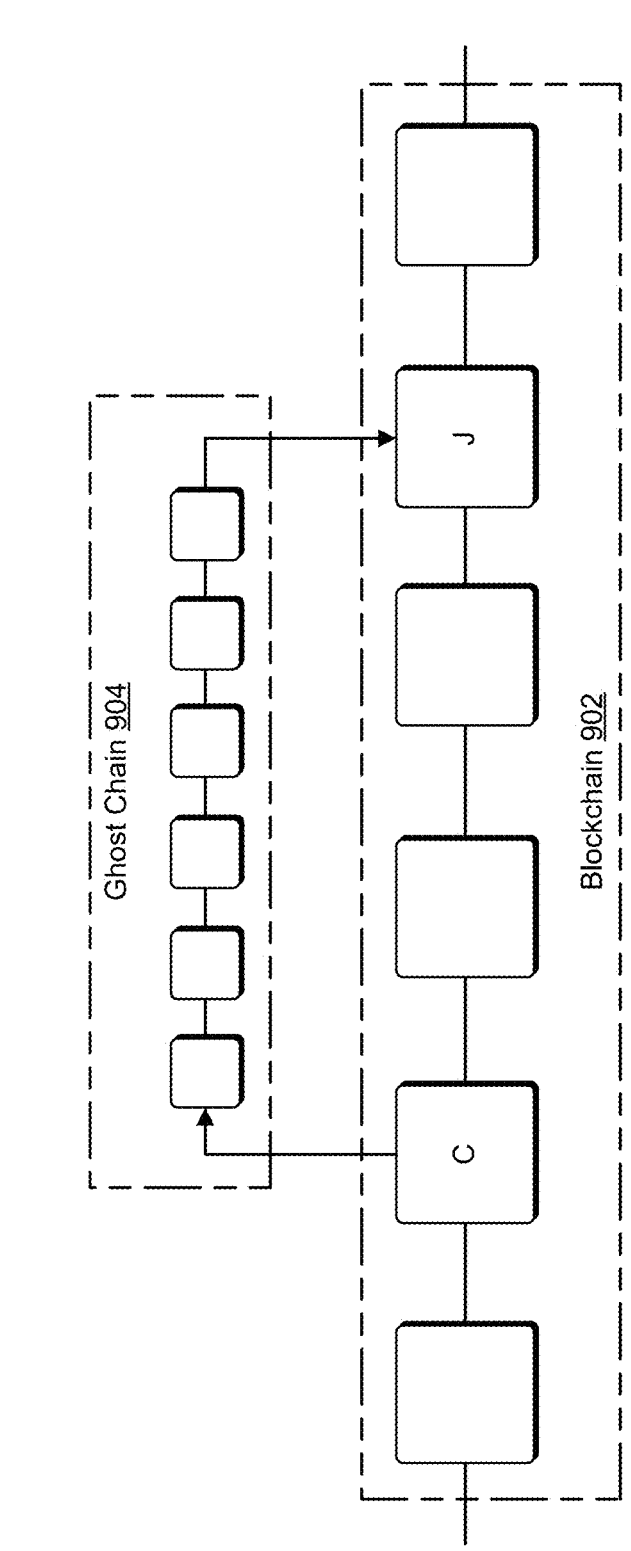
FIG. 9 is a block diagram of an example blockchain and an example ghost chain.

Referring now to FIG. 9, a diagram 900 illustrates a blockchain 902 and a ghost chain 904. The blockchain 902 is a block-based distributed proof-of-work ledger. The ghost chain 904 is a block-based distributed proof-of-stake distributed ledger that may be used for any purpose, such as to construct a decryption key in accordance to one or more conditions specified in a flagged transaction or to arbitrate a dispute between nodes in a blockchain network. For example, the blockchain may include a challenge in which one node challenges work product submitted by another node. Such a challenge is denoted "C" in FIG. 9. The challenge may occur, for example, when a node (i.e., a challenger) indicates that a result proposed in fulfilment of a request is invalid.

When the challenge is issued by a node, the ghost chain 904 is deployed. The ghost chain is instantiated after the challenge C occurs in response to the challenge. The ghost chain may be instantiated with a genesis block that is the final block (also referred to as a terminal block) from a previous instantiation of the ghost chain. A number of blocks are added to the ghost chain by miners to resolve the digital dispute until the ghost chain reaches a judgment, denoted J.

When a judgment is reached, a transaction (referred to below as a final transaction or settlement transaction) may be constructed and signed (as will be described in greater detail below). This transaction may be a transaction whose effect will be to distribute funds on the main blockchain 902 in accordance with the judgement, distribute funds to remunerate miners of the ghost chain, etc. The transaction may also communicate the results of the judgment back to the main blockchain 902. More particularly, the results may be encapsulated in the transaction.

After judgment has been reached and the final transaction constructed and signed, the ghost chain 904 terminates and the constructed transaction is mined into the main blockchain 902. Since the ghost chain 904 terminates, it is unlike a typical blockchain in that it has a terminal block. This terminal block, which is the last block in the ghost chain 904 occurs when the judgment is determined and the resulting transaction which distributes funds on the main blockchain 902 in accordance with the judgement, distributes funds to remunerate miners of the ghost chain, etc., is validly signed.

Requester-Proposer-Challenger and Ghost Chains

Accordingly, nodes 102 (FIG. 1) in the blockchain network 100 (FIG. 1) may implement a requester-proposer-challenger protocol and/or a ghost chain resolution protocol. Such nodes 102 may include computer-executable instructions stored in memory 220 (FIG. 2) which implement such protocols. Such instructions, when executed by a processor 210 (FIG. 2), cause a node 102 (such as an electronic device 200 of the type described with reference to FIG. 2) to perform one or more methods of the protocols. Such methods may include any one or combination of the methods 1000, 1100, 1200, 1300 of FIGS. 10 to 13.

Reference will now be made to FIGS. 10 to 13 which illustrate methods that may be included in a requester-proposer-challenger protocol and/or a ghost chain resolution protocol. A requester method 1000, illustrated in FIG. 10 may be performed by a requester of a task in a computation exchange. That is, a node 102 which requests completion of a task may perform the requester method 1000 of FIG. 10. The node is a node in a blockchain network 100 (FIG. 1) and the node may be referred to as a requester.

Figure 11:
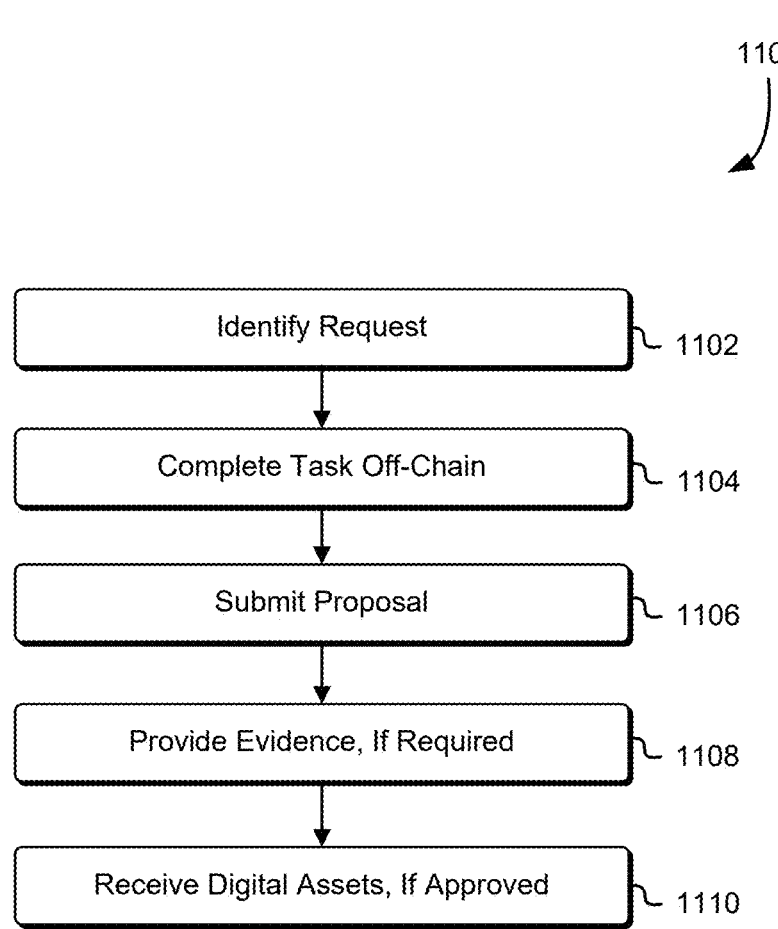
FIG. 11 is a flowchart of an example proposer method for proposing a solution to a task.

A proposer method 1100 is illustrated in FIG. 11. The proposer method 1100 may be performed by a proposer of a solution to the task. That is, a node 102 which claims to have completed the task may perform the method 1100 of FIG. 11. The node is node in the blockchain network 100 (FIG. 1) and the node may be referred to as a proposer.

Figure 12:
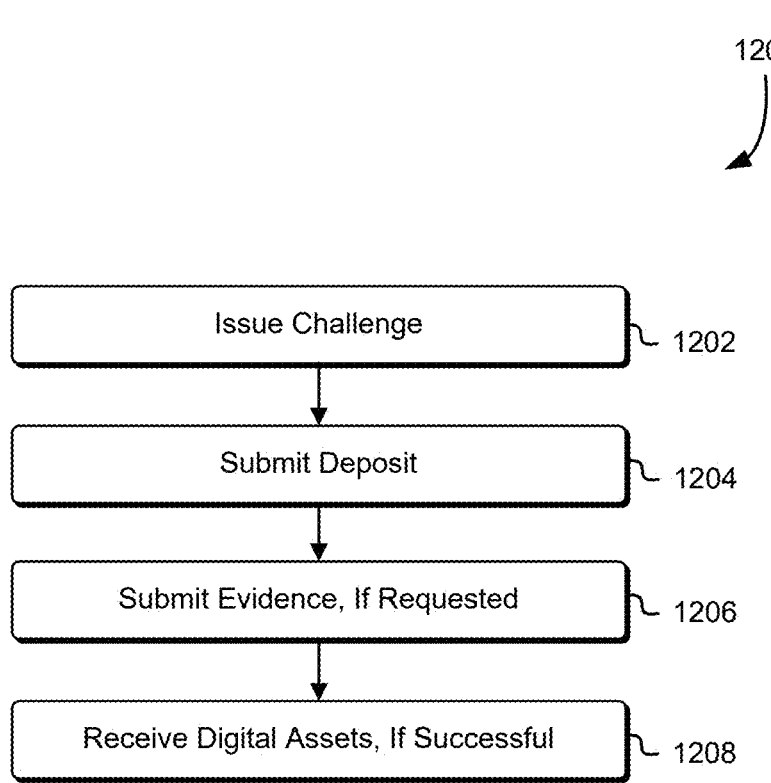
FIG. 12 is a flowchart of an example challenger method for challenging a solution to a task.

A challenger method 1200 is illustrated in FIG. 12. The challenger method 1200 may be performed by a challenger of the solution to the task. That is, a node 102 which challenges the solution put forward by the proposer may perform the method 1200 of FIG. 11. The node is a node in the blockchain network 100 (FIG. 1) and the node may be referred to as a challenger.

Figure 13:
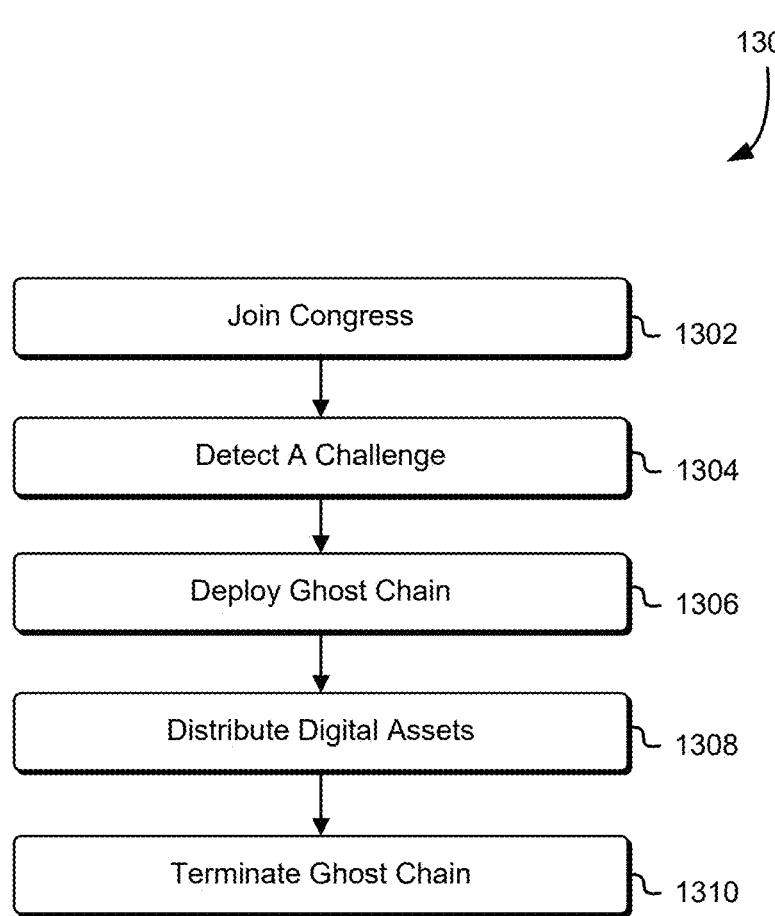
FIG. 13 is a flowchart of an example arbitrator method for arbitrating a challenger to a solution to a task.

An arbitrator method 1300 is illustrated in FIG. 13. The arbitrator method 1300 is performed by a node of blockchain network, in cooperation with other nodes of the blockchain network. A node performing the arbitrator method in cooperation with other nodes may be referred to as an arbitrator.

The methods 1000, 1100, 1200, 1300 of FIGS. 10 to 13 are performed cooperatively. For example, the methods collectively provide a requester-proposer-challenger protocol in which a ghost chain is used to ensure the validity of a proposer's solution.

At operation 1002 of the requester method 1000 (FIG. 10) a node, which will be referred to as the requester, issues a request. The request is a request to complete a task. For example, the task may be a request for work product or to determine whether an off-chain event has occurred, which is described in greater detail below. The request offers a bounty in the form of digital assets associated with the blockchain network 100 in exchange for successful completion of the task. The request may be issued off of the blockchain (i.e., "off-chain"). For example, the request may be issued on a web server accessible via the Internet. The request is defined to be successfully completed either when a candidate solution to the request goes unchallenged for a fixed period of time (which may referred to as a "challenge period") or, in the case of a challenge which is resolved by having members of the congress vote for whether the candidate solution is correct. In some embodiments, the ghost chain is deployed in response to the outcome of the vote.

In some embodiments, such as those described below, a computation exchange may allow nodes to offload computational tasks. The request (at operation 1002) may be issued in a computation exchange. The computation exchange may be a collection of tasks that are requested. For example, a plurality of tasks may be published in the computation exchange. The tasks may be published by the same requester or by different requesters. The computation exchange allows nodes to offload computations or the performance of algorithms to other nodes.

At operation 1102 of the proposer method 1100 (FIG. 11), a node, which will be referred to as the proposer, identifies the request. The node then proceeds (at operation 1104) to complete the task off-chain. For example, an algorithm, data, or other result requested by the requester may be obtained as work product by a processor.

The proposer may then submit a proposal at operation 1106 of the method 1100 (FIG. 11). The proposal is a claim to have completed the task associated with the request issued by the requester at operation 1002 of the method 1000 of FIG. 10. To submit the proposal, the proposer may send their public key for the blockchain network 100 to the requester. The proposer may also commit to the solution to the task. This commit could be in the form of a hash of the solution (i.e., a hash of the work product, such as the output of a computation or a solution of another type).

Figure 10:
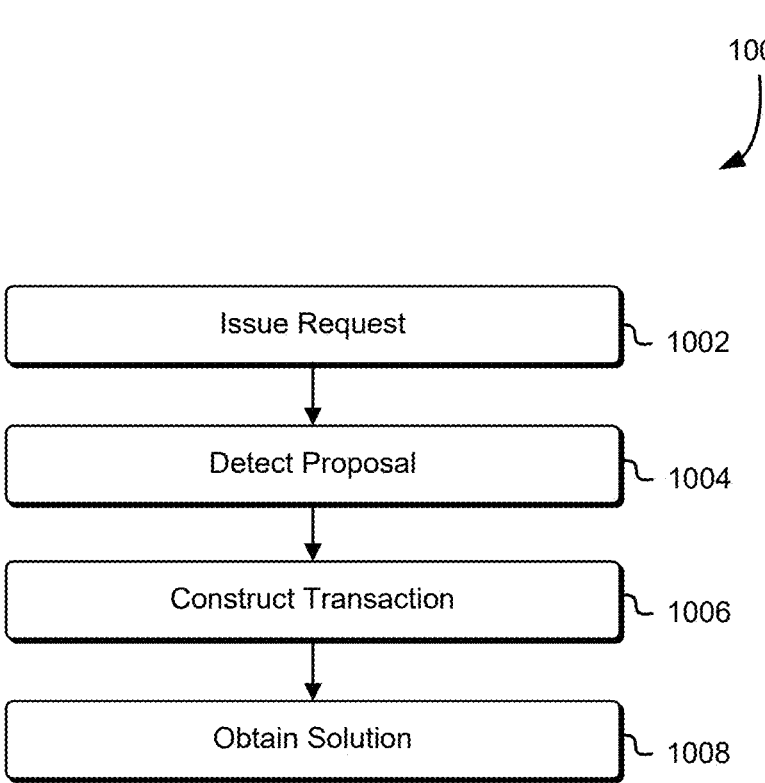
FIG. 10 is a flowchart of an example requester method for requesting completion of a task.

The requester receives the proposal at operation 1004 of the method 1000 of FIG. 10. For example, the requester may receive the proposer's public key and the "commit" (e.g., the hash of the purported work product).

In response to receiving the proposal, at operation 1006 of the method 1000 of FIG. 10, the requestor may construct a transaction, T1. The transaction includes the bounty as input. The transaction includes the bounty and also a proposer deposit as output (i.e., T1_out=bounty+proposer_deposit). The transaction, T1, is signed to allow a proposer to add their own input. For example, the transaction, T1, may be signed SIGHASH_ALL|SIGHASH_ANYONECANPAY. SIGHASH_ALL is a default signature hash type which signs the entire transaction except any signature scripts, preventing modification of the signed parts. SIGHASH_ANYONECANPAY is a signature hash type which signs only the current input.

The transaction, T1, is constructed to be unlocked in two ways. After the expiration of a challenge period (described below) it may be unlocked with a signature of the proposer (i.e., a signature corresponding to the public key that the proposer provided to the requester) and the solution corresponding to the commit. For example, the operation code OP_CHECKSEQUENCEVERIFY may be used to lock the transaction for the challenge period but to allow unlocking by the proposer if there is no challenge within this period. The transaction is also constructed to be unlocked with the group signature of the congress 110 (FIG. 1) at any time. That is, the transaction can be unlocked before or after expiration of the challenge period when nodes that are members of the congress cooperate using their respective private key shares to unlock the transaction in accordance with the threshold signature scheme for the congress 110.

The transaction may also include information about the alleged solution such as the commit. For example, the hash of the purported work product may be added to the transaction using the OP_PUSHDATA operation code. More particularly, the hash of the purported work product may be added to a locking script of the transaction. This locking script is configured to be unlocked (after expiration of the challenge period) by an unlocking script that provides a solution that hashes to the hash of the purported work product contained in the locking script.

While not illustrated in FIGS. 10 and 11, the proposer may receive the transaction, T1, constructed at operation 1006 and may add the proposer deposit as an input to the transaction, T1. The proposer broadcasts the transaction to other nodes of the blockchain network 100 (FIG. 1). The transaction is then mined onto the blockchain (i.e., added to a block) so that it is publicly visible.

Once the transaction is mined onto the blockchain, a challenge period is initiated during which any node 102 (FIG. 1) may challenge the proposal submitted by the proposer. If no challenge is issued during the challenge period, the proposer may claim the bounty and the proposer deposit from the transaction T1. The proposer may initiate a timer to track the amount of time remaining in the challenge period and may automatically take action once the challenge period has expired. For example, the proposer may provide work product (which may be referred to as the solution), such as processor work product, to the requester and may unlock the transaction. In an example, the proposer provides work product that indicates an off-chain event has occurred and any node 102 (FIG. 1) may challenge the proposed solution that the off-chain event has in fact occurred.

The proposer may not provide the solution directly to the requester. Instead, the proposer may provide the solution by embedding the solution in a transaction on the main blockchain network. For example, the proposer may provide the solution in an unlocking script, which unlocks a locking script (in the transaction T1) that encumbers the bounty and the proposer deposit (e.g., in an unlocking script that causes the locking script of T1 to evaluate to TRUE). As noted above, the locking script may be configured to check that the proposed solution in the unlocking script hashes to the value that the requester was previously given by the proposer (i.e., in the "commit"). When the unlocking script successfully unlocks the locking script that encumbers the digital assets previously encumbered by the locking script of transaction T1 (i.e., the UTXO of transaction T1), the transaction that contains the unlocking script spends the transaction by encumbering the digital assets (i.e., the proposer deposit and bounty) with a new locking script (which may, for example, use the proposer's public key to encumber the digital assets so that the proposer now has complete control over the digital assets).

As noted above, the transaction, T1, may be constructed to lock the bounty and proposer deposit using the OP_CHECKSEQUENCEVERIFY code. This permits the proposer to automatically claim the bounty and proposer deposit after expiration of the challenge period without further approval from the requester.

It can be noted that, if there is no challenge to the proposer's solution, the complete transaction can be performed on the proof-of-work main blockchain 902 (FIG. 9) without need for execution of a challenge protocol or of a ghost chain protocol.

However, a challenger may issue a challenge during the challenge period. For example, at operation 1202 of the method 1200, a challenger issues a challenge. The challenger may have performed operations similar to operations 1102 and 1104 in the method 1100 of FIG. 11. That is, the challenger may have identified the request and may have completed the task off-chain prior to issuing the challenge at operation 1202. The challenger may also have determined that the challenge should be issued by determining that the challenger's solution differs from that of the proposer. The challenger may, for example, perform a hash of their solution and compare that hash to the hash of the proposer's solution and, if the hashes differ, the challenger may issue the challenge.

At operation 1202 of the method 1200 of FIG. 12, the challenger issues a challenge within the challenge period. The challenger may do so by broadcasting an intention to challenge to the blockchain network 100. When a challenge is issued, a group of nodes may assist in determining validity of solutions. For example, a challenge may be issued in response to a proposal that an off-chain event has occurred, the challenge asserting that the off-chain event has not actually occurred, whereby a group of nodes (e.g., a congress) may determine whether the accept the solution provided by the proposer or the challenger.

For example, referring briefly to FIG. 13, which illustrates a flowchart of an arbitrator method 1300, a group of nodes may form a congress, which may be used to perform an arbitration when a challenge is raised. The congress is, as noted above, secured by deposit of digital assets on a proof-of-work blockchain network. For example, at operation 1302 of the method 1300, an arbitrator performing the arbitrator method 1300 may join a congress. For example, the arbitrator may perform the method 400 of joining the congress described above with reference to FIG. 4. Accordingly, at operation 1302, the arbitrator joins a group, which may be referred to as a congress, through deposit of digital assets to a public group address associated with the congress to become a group member. The arbitrator makes this deposit on a proof-of-work blockchain network. As described above, the group is associated with a threshold signature scheme for which the node controls a private key share. The joining of the group (which may also be referred to as enrolment) may, for example, be performed during deployment of a ghost chain. Since FIG. 13 illustrates operation 1302 (joining the congress) as being performed prior to operation 1306 (deployment of the ghost chain), it is performed by a node that joined the congress during a previous deployment of the ghost chain (i.e., not during the deployment at operation 1306). However, operations 1306, 1308 and 1310 could, for example, be performed by nodes that join the group during operation 1306.

At operation 1304, the arbitrator cooperates with other nodes of the group to detect the challenge issued by the challenger at operation 1202 of the challenger method 1200 of FIG. 12. More particularly, the arbitrator cooperates with other nodes of the group to detect a challenge, by the challenger, to work product of a proposer in response to the request made by the requester.

Due to the transaction, T1, discussed above, when a challenge is issued, the group assumes control of the bounty and proposer deposit. That is, the transaction, T1, is constructed to be unlockable by the congress at any time. The bounty and deposit are, therefore, placed under and maintained under control of the group when the challenge is detected within a time period referred to as the challenge time following the committal by the proposer to a solution to the request. Thus, when the challenge is detected, the group has control of the bounty and proposer deposit.

After the group has control of the bounty and the proposer deposit and in response to detecting the challenger, the arbitrator may cooperate with other nodes of the group to facilitate deposit of digital assets by the challenger. For example, in response to detecting the challenge, the congress may construct a transaction, T2 with an input that is equal to the bounty and the proposer deposit (e.g., T2_in=bounty+proposer deposit) and an output that is equal to the sum of the bounty, the proposer deposit, and the challenger deposit (e.g., T2_out=bounty+proposer deposit+challenger deposit). The transaction, T2, is configured to pay at any time to the group. That is, the transaction, T2, is configured to pay to the congress public key. The transaction, T2, may be signed SIGHASH_ALL|SIGHASH_ANYONECANPAY. The arbitrator, together with other arbitrators, may provide the transaction, T2, to the challenger for adding of the challenger deposit as input. For example, the arbitrator, together with other nodes, may make the transaction, T2, publicly available to other nodes.

After the transaction, T2, is made publicly available, the challenger adds a challenger deposit as an input to the transaction, T2. That is, the challenger provides a deposit (at operation 1204 of the challenger method 1200 of FIG. 12) of digital assets and places such deposit under control of the group. More particularly, the challenger deposit is placed under control of the congress public key. The bounty, proposer deposit and challenger deposit are, therefore, all placed under control of the group and encumbered by the congress public key. As described in greater detail in the description of congresses above, a threshold signature scheme allows a threshold number of members of the congress to use respective private key shares to cooperatively generate a valid signature for transactions involving the bounty, proposer deposit and challenger deposit. The proposer deposit and the challenger deposit may be of equal size.

The challenger may also commit to their challenge solution. For example, the challenger may add a hash of the solution to the transaction, T2, using the operation code OP_PUSHDATA, for example.

The transaction, T2, is broadcast to the main blockchain network and is mined onto the main blockchain network so that the challenger deposit is encumbered by the congress public key. The bounty, proposer deposit and challenger deposit are now placed under the exclusive control of the group.

Thus, the challenger provides evidence of an alternative solution and a deposit to the arbitrator. After the transaction T2 is mined onto the main blockchain network, at operation 1306 of the arbitrator method 1300, the arbitrator cooperates with other nodes of the group to deploy a ghost chain to resolve the challenge. As described above, the ghost chain is a proof-of-stake blockchain in which miners of the ghost chain are members of the group. That is, members of the congress are permitted to mine on the ghost chain. Their member deposit on the proof-of-work blockchain network serves as their stake to allow them to mine on the ghost chain and the probability of any member being selected to mine is proportional to the relative amount of their deposit.

While the ghost chain is deployed (at operation 1306), a genesis block for the ghost chain may be created or obtained by the arbitrator in cooperation with other nodes of the group. The genesis block may be a final block from a last ghost chain deployment (e.g., the terminal block from the last instance that a ghost chain was run and the previous run may have been in response to a past challenge). This block may contain information regarding genesis payments. Genesis payments are transfers of digital assets, which are yet to be made that are due based on a previous deployment of the ghost chain.

Further, while the ghost chain is deployed, members may be permitted to enroll or may request to disenrol from the group. During the enrolment stage, new members may be enrolled so that they are allocated private key shares (as described above with reference to FIG. 4). The new members are provided with the genesis block (which is authenticated by a threshold of current members) and any subsequent blocks which were generated during the enrolment process.

A pre-disenrollment stage may also be included in the ghost chain run. During this pre-disenrollment stage, any member who has requested to be disenrolled may send attestation to deletion of certain private data. Such attestation may be required for the return of a member deposit. Any evidence of misbehaviour which may preclude the return of a member deposit may be sent at this stage (for example, a newly enrolled member may submit a genesis block that has been precommitted to by a current member or members, but is suspected to be fake). Techniques for disenrolling are described in greater detail above with reference to FIG. 8.

The deployment of the ghost chain may include, by the arbitrator in cooperation with other nodes of the group, an adjudication operation. The adjudication operation may include receiving evidence from the proposer and challenger and resolving the challenge based on the evidence. For example, the received evidence may include one or both of a final solution or an intermediate result. The intermediate result may be the result of a step or a series of steps required to perform the requested task. For example, the intermediate step may be partial work product for the task. The final solution is the final work product that completes the requested task. Evidence may be submitted by the proposer at operation 1108 of the proposer method 1100 of FIG. 11 and by the challenger at operation 1206 of the challenger method 1200 of FIG. 12. In some cases, the final solution is provided without the intermediate results that are used to arrive at the final solution (e.g., an assertion that an off-chain event has occurred or not occurred may be provided without intermediate results).

The arbitrator and other nodes of the congress may resolve the challenge by performing the task associated with the request to determine a correct solution. For example, the task (e.g., a computation or algorithm) may be performed on-chain (i.e., on the ghost chain itself). The group may determine which of the proposer and challenger solutions is correct by comparing such solutions with its own solution, determined on the ghost chain. During this process, the group members (i.e., the ghost chain miners) perform computations and/or analysis to arbitrate on the dispute. The group members reach consensus and sign blocks during this process. In some cases, resolving the challenge may involve a vote by the nodes (e.g., members of a congress) to determine whether the proposer solution or the challenger solution should be accepted—this may be used, for example, in cases where the solution is a binary solution having either of two values, such as determining whether an off-chain event has occurred or not occurred. The result of the vote may be defined to be the truth as to whether the off-chain event has occurred or not and may be treated as the correct solution.

The arbitrator (in cooperation with other nodes of the group) reach a judgment while the ghost chain is deployed. Judgment is said to have been reached when the arbitrator and other nodes of the congress resolves the challenge (i.e., when such nodes form consensus on the resolution). After judgment for an arbitration is reached on the blockchain, the arbitrator cooperates with other nodes of the group to construct a final transaction (to be mined to main blockchain network when fully signed). The final transaction, which may also be referred to as a settlement transaction, may contain various digital asset transfers; for example: (i) bounty+deposit (which may be transferred to a node that has been deemed successful or vindicated in the course of the adjudication); (ii) mining fees (for ghost chain mining already performed); (iii) genesis payments (which are digital asset transfers that are due based on a previous run of the ghost chain and which are determined from the genesis block); and/or (iv) return of member deposits of disenrolled members.

This transaction may also contain useful metadata; for example, the settlement transaction may transfer the solution back to the blockchain network. Accordingly, during this process, the group (i.e., the arbitrator in cooperation with other nodes of the group) may commit the result of the adjudication to the blockchain network. The group may also commit, to the blockchain network, a Merkle root hash of intermediate computational states as determined on-chain on the ghost chain.

Accordingly, digital assets under group control may be distributed (at operation 1308) by the arbitrator in cooperation with other nodes of the group. The distribution of such digital assets is performed according to a threshold signature scheme defined for the congress (i.e., for the group). As noted in the discussion of congresses above, the threshold signature scheme is configured such that at least a threshold number of members are required to generate a valid signature for the congress public key. Accordingly, the arbitrator, together with other nodes of the group (i.e., together with the other arbitrators), may consent to transfer digital assets by adding a partial signature to the final transaction using the arbitrator's private key share. Other nodes also add partial signatures using their respective private key shares until at least a threshold number of private key shares required under the threshold signature scheme are used to create a valid signature for the final transaction.

The particular method of distributing the digital assets in the final transaction will depend on the result of the arbitration. For example, when the challenge is successful, the arbitrator may cooperate with other nodes to transfer at least the challenger deposit to the challenger and to distribute the proposer deposit to miners of the ghost chain in proportion to the absolute number of blocks mined. When the challenge is successful and when the challenger's solution is determined to be correct, the bounty may also be transferred to the challenger. Thus, the challenger may receive digital assets at operation 1208 of the challenger method 1200 of FIG. 12. However, where a binary search is used so that a correct solution is not identified, the bounty may be returned to the requester who may re-publish the request, allowing the challenger to submit a proposal based on their answer. Alternatively, when the proposer is eliminated through binary search, the requester may treat the challenger's commit as a proposal and may resume operations at operation 1006 of the method 1000 of FIG. 10. That is, the requestor may construct a new transaction, T1, based on the challenger's proposal. This transaction may be as described above with reference to operation 1006 except that the node that was formerly considered to be the challenger is now considered to be the proposer. Thus, a new transaction T1 may be constructed to be unlocked by the challenger after expiration of the challenge period by providing a solution that corresponds to the hash of the solution as provided by the challenger in the transaction, T2, described above.

When the work product of the proposer is determined to be valid, the arbitrator may cooperate with other nodes to transfer the bounty and the proposer deposit to the proposer and to distribute the challenger deposit to miners of the ghost chain in proportion to the absolute number of blocks mined. Thus, the proposer may receive digital assets at operation 1110 of the method 1100 of FIG. 11.

The requester receives the solution at operation 1008 of the requester method 1000 of FIG. 10. The method by which the requester receives the solution at operation 1008 may depend on whether a challenge was issued. If, for example, no challenge was issued, the proposer committed the solution to the blockchain using the transaction, T1, described above with reference to operation 1006 of the method 1000 of FIG. 10. If, however, a challenge is issued and if the ghost chain determines a solution to the request, the ghost chain nodes may transmit the solution to the requestor on termination of the ghost chain (e.g., at operation 1310 of the arbitration method 1300 of FIG. 13). The ghost chain protocol may, therefore, cause the nodes participating in the ghost chain to automatically transmit the solution to the requester upon determining the solution.

Further, after judgment is reached on the ghost chain and a transaction is constructed and validly signed, the ghost chain terminates (at operation 1310 of the arbitration method 1300 of FIG. 13). That is, upon resolution of the challenge the ghost chain terminates. When the ghost chain is terminated, information pertaining to the resolution of the challenge may be transferred back to the proof-of-work blockchain network.

When the ghost chain terminates, no further blocks are mined onto the ghost chain. That is, unlike a typical blockchain, the ghost chain has a terminal block. The ghost chain may be implemented as a proof-of-stake blockchain that does not fork. The absence of forks means that there will be a definite terminal block when the ghost chain terminates (i.e., a terminal block that is agreed upon by all nodes of the group). After this terminal block, the ghost chain has served its purpose and is not added to.

As noted previously, when the arbitrators (i.e., the nodes of the congress) reach judgement, the nodes cooperate to construct a transaction that will be broadcast (at operation 1308) on the mainchain once the transaction a valid signature has been generated through addition of partial signatures according to the threshold signature scheme as described above. Since this transaction is, itself, a multi-party computation, nodes that contribute towards this transaction may expect to be rewarded for taking part in this transaction. However, since the transaction is specified before it is signed, remuneration for taking part in the signing (which may include sending of partial signatures to the ghost chain by way of transactions as well as actually mining the blocks) may be deferred until further ghost chain deployment. Such deferral may be provided for in operation 1310. More specifically, the terminal block may be constructed with information that allows genesis payments to be processed during a future deployment of the ghost chain. Such information may be a record of mining fees which are due for blocks that were created after the final transaction was constructed, such as blocks that were created during the signing of the final transaction. That is, the genesis payments may be defined to reward nodes that contributed towards the signing of the final transaction. The terminal block of the ghost chain will become the genesis block of the next ghost chain run (i.e., the next time a ghost chain is deployed). A record is, therefore, created in the terminal block for future genesis payments.

Note that, according to the implementation noted immediately above, members enrol/disenrol during a ghost chain run—which may be triggered by a challenge. An alternative implementation would also allow enrolment/disenrollment at regular intervals or under other conditions. This may involve the scheduled run of a ghost chain, specially for this purpose, which would be similar to the ghost chain deployment described above except without the adjudication and judgment stages. In this case, the mining fees could be paid at least partially, from 'enrolment fees' which are required in return for enrolling.

Also note that the method 1300 described above described a ghost chain run which is not a first ghost chain run. That is, the method 1300 described the deployment of a ghost chain that had been deployed at some point in the past such that a terminal block containing genesis payments already exists for the ghost chain. The method 1300 may be modified to allow a first ghost chain to be deployed. For example, the first time that the ghost chain is deployed, the genesis block may be established in another way. For example, the genesis block may be provided by an initially trusted party.

By using a proof-of-stake based blockchain to arbitrate a challenge, the ghost-chain solution can provide faster resolution than performing such arbitrations on the proof-of-work blockchain network itself since proof-of-stake allows for more regular block generation and can be configured to allow for high-frequency block generation. Further, by performing such arbitration operations on the ghost chain rather than on the main blockchain itself, tasks are pushed off of the main blockchain network so that the main blockchain network is less burdened.

Further, the transient nature of the ghost chain (i.e., the fact that the ghost chain is temporary in nature and terminates) may avoid or reduce the risk of the nothing-at-stake problem that typically affects proof-of-stake blockchain networks. The temporary nature of the ghost chain network allows the congress to require miners of the ghost chain to leave their deposits in place until the ghost chain terminates. That is, the congress may be configured to not permit any congress members to withdraw their stake while the ghost chain is running.

While the examples described above have referred to operation codes available in Bitcoin, the methods described herein may also be used with other types of blockchain networks.

The methods described above have been generally described as being performed at a node, but features of the method rely on cooperation with other nodes and could be performed elsewhere.

Event-Lock Encryption from Congresses and Ghost Chains

Techniques for using congresses and ghost chains to perform event-lock encryption are described below.

Event-lock encryption may refer to mechanisms for performing cryptographic operations in response to the occurrence of an event. As an example, time-lock encryption is a specific type of event-lock encryption that refers to a mechanism for sending messages "to the future" such that a given ciphertext will be decrypted at or after a particular point in time in the future. In this case, the event is the passage of a (possibly random) amount of time. Event-lock encryption may, therefore, be used to ensure the performance of cryptographic operations contingent upon the occurrence of an event. Examples of cryptographic operations that may be performed include the decryption of ciphertext, the authentication of a message or data which is digitally signed, and more. For example, techniques described herein may be utilized to improve the efficiency of solving problems presented in the context of witness encryption, as discussed, for example, by Bitanksy, et al., in "Time-Lock Puzzles from Randomized Encodings."

For purposes of illustration, the cryptographic operation performed as part of an event-lock encryption discussed in connection with FIGS. 9 and 10 is the decryption of ciphertext contingent upon determining the occurrence of an event. However, in various embodiments, other cryptographic operations may be performed in place of or in addition to those described in connection with those shown in FIGS. 9 and 10. Generally speaking, one or more operations such as cryptographic operations may be performed upon determining the event has occurred.

Events that are used to facilitate event-lock encryption may be categorized as on-chain events and off-chain events. On-chain events may refer to events which can be observed through inspection of the blockchain, and off-chain events may refer to events that are not on-chain events. A message may be encrypted to a public key A in accordance with an identity-based encryption scheme. The public key A may be a cryptographic public key having a corresponding cryptographic private key SkA that the entity performing the encryption has access to. The congress public key may be in accordance with those described elsewhere, such as in connection with FIG. 1. The encrypted message, the public key A, and an event (e.g., a time threshold) that is digitally signed by the private key SkA may be sent to the blockchain via a flagged transaction. When the event is observed by the congress, a ghost chain may be instantiated and a decryption key may be constructed, thereby facilitating decryption of the encrypted message. Various techniques for detecting when the event has occurred are discussed below.

As discussed elsewhere, such as in connection with FIG. 4, an entity may deposit digital assets with a congress pool, and receive, in response, a private key share to the congress 110. In some embodiments, the shares that the entity receives may be in proportion to the amount and/or value of the digital assets deposited. Private key shares may be utilized in a threshold signature scheme in which the congress controls digital assets encumbered by a public key associated with the congress. The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited for reasons other than obtaining private key shares. Non-members or members may deposit digital assets to the address associated with the congress for various reasons. For example, a reason to deposit digital assets to the address associated with the congress is to provide a fee for the performance of one or more instructions upon detecting occurrence of an event.

Miners of a ghost chain may cooperate to construct a decryption key. In general, a ghost chain 904 may be deployed for any reason, not just to resolve disputes. The ghost chain may be instantiated and serve as an append-only noticeboard to share information used in the construction of a decryption key. Members of a congress may be miners of the ghost chain. In some embodiments, a method for performing threshold encryption and decryption may be described in accordance with techniques described herein. An entity may perform an encryption in accordance with an identity-based encryption scheme. For example, an entity may encrypt a message to a cryptographic public key associated with the entity, the encryption utilizing a congress public key as a system-wide public key of an identity-based cryptography scheme. The identity-based encryption scheme may be in accordance with those described by Boneh and Franklin in "Identity-based encryption from the Weil pairing." Accordingly, an entity can encrypt a message to a cryptographic public key using a system-wide public key. The entity may have access to a corresponding cryptographic private key, and the system-wide public key may be the congress public key.

A transaction may be broadcasted to a proof-of-work blockchain network and the transaction may include an encrypted message in accordance with an identity-based encryption scheme, the message public key A (i.e., the cryptographic public key that the message is encrypted to, under the identity-based encryption scheme), an event which should trigger the decryption of the encrypted message, and a fee. In some embodiments, the message public key A is associated with the entity that has access to a signing key SkA wherein the message public key A and the signing key SkA are, respectively, public and private keys of an asymmetric key pair. The transaction may further include data that is digitally signed using the private signing key SkA. For example, a set of conditions to decrypt the encrypted message may be digitally signed using the private signing key SkA such that the validity of the digital signature is verified using the message public key A prior to deriving a decryption key (e.g., in cases where the message public key A and private signing key SkA form an asymmetric key pair). Generally speaking, the set of conditions may include information such as when the decryption should occur (e.g., in response to a time-based event) and the manner in which the decryption should occur (e.g., whether or not the contributions to the decryption key should themselves be encrypted under a set S of public keys so as to make the decryption key available to one or more entities possessing access to a set of private keys corresponding to the set S of public keys). The event may be an event or condition which, when satisfied, indicates that the encrypted message should be made decryptable by making the decryption key available. The fee may be a transfer of digital assets to the address associated to a public group address of the congress 110. The fee may be distributed among members of the congress that cooperate and participate in performing an event-lock decryption of the encrypted message.

In some cases, it may be understood implicitly that the encrypted message is to be decrypted and/or made decryptable upon verification of the occurrence of the event. In other cases, the transaction may further include instructions to perform one or more operations in connection with the encrypted message. For example, the instructions may be to perform a decryption of the message and an authentication of the decrypted contents. In other embodiments, the instructions may be to perform a decryption of a message which may include information (e.g., a private key) the possession of which effectively transfers assets to the bearer.

When a consensus has been reached on the main blockchain that the event has occurred, a ghost chain may be deployed to generate a decryption key that may be used to decrypt the encrypted message. In general, for on-chain events, consensus is reached that the event has occurred, whereas for off-chain events, consensus may be reached that a threshold number of attestations have been observed. Accordingly, a ghost chain may be deployed. The ghost chain may be in accordance with those described elsewhere in this disclosure, such as those discussed in connection with FIGS. 9 to 13. The ghost chain 904 may be instantiated with a genesis block that is the final block from a previous instantiation of the ghost chain. A number of blocks are added to the ghost chain by miners to derive the decryption key.

The blocks added to the ghost chain may be used to construct a decryption key that is usable to decrypt the encrypted message. Upon inclusion of the necessary quantities into the ghost chain blocks (e.g., when the decryption key can be generated), a final transaction may be constructed and signed whose effect will be to distribute funds on the main blockchain 902—for example, nodes that participate in mining of the ghost chain may be paid to construct the decryption key. In some cases, the decryption key may be encrypted using a public key associated with an intended recipient and submitted to the ghost chain 904 in an encrypted format. The intended recipient may use the corresponding private key to cryptographically derive the decryption key. In some cases, this information may be published to the main blockchain.

After the final transaction is constructed and signed, the ghost chain 904 terminates and the constructed transaction is mined into the main blockchain 902. Since the ghost chain 904 terminates, it is unlike a typical blockchain in that it has a terminal block. This terminal block, which is the last block in the ghost chain 904 occurs upon deriving the decryption key or completion of other operations that may be specified and the resulting transaction which distributes funds on the main blockchain 902, distributes funds to remunerate miners of the ghost chain, etc., is validly signed.

In an embodiment, a decryption key may, alternatively, be derived using a sidechain. A sidechain may refer to a proof-of-stake blockchain that runs continuously, and is not configured to terminate upon derivation of the decryption key—the sidechain may continue to operate and may be configured to perform various tasks beyond deriving the decryption key. In an embodiment, a sidechain is a proof-of-stake blockchain that is configured to facilitate a plurality of activities, including but not limited to deriving a cryptographic key. A number of blocks are added to the sidechain by miners to derive the decryption key. The blocks added to the sidechain may be used to construct a decryption key that is usable to decrypt the encrypted message. Upon inclusion of the necessary quantities into the sidechain blocks, the decryption key may be obtainable.

Events may generally be categorized as on-chain events or off-chain events. An on-chain event may refer to events whose occurrence or non-occurrence may be based on information obtainable from a blockchain. For example, information obtainable from the blockchain may include information on the occurrence of one or more transactions (e.g., a transfer if digital assets from a particular party to another party, a certain number of transfers, a certain amount being transferred, and so on), information included in a transaction, such as a timestamp when a transaction occurred, or may include information in a block header, such as the block height. Generally speaking, consensus as to on-chain events may be reached quickly and efficiently by the members of the congress. For on-chain events, the TEEs will utilise the key-shares held inside to contribute to the construction of the decryption key when they observe the required event in a confirmed block, on the blockchain.

An off-chain event may refer to an event whose occurrence or non-occurrence may be based on information outside of the blockchain. An off-chain event may include any information on which members of the congress can make a decision. For example, an off-chain event could be making a determination that a person has died. A decryption key may be generated (or a decryption of the encrypted message may occur) in response to determining the event has occurred. Generally speaking, TEEs do not evaluate whether an off-chain event occurred. Instead, the nodes of the congress evaluate whether the event occurred and may attest to either having verified the occurrence or non-occurrence of the event by emitting an attestation to the occurrence or non-occurrence of the event and signing the attestation using a secret key that only the node has access to. For example, the attestation could be digitally signed and cryptographically verifiable using a public key corresponding to the account from which the member's security deposit was transferred. A consensus may be reached on the observation of a threshold of attestations, and a transaction may be constructed and signed as described above.

In an embodiment, event-lock encryption may be implemented at least in part using a mainchain and a blockchain, for example, in connection with various embodiments described above. In embodiments that are configured to use a sidechain to perform one or more cryptographic operations (e.g., derivation of a decryption key), an on-chain event that triggers the construction of the decryption key may be an event on either a main blockchain or a sidechain. For example, in the case of time-lock encryption in which the decryption key should be made available at a threshold time, passage of the threshold time may be detected based on the timestamp detected on a block mined to the main blockchain or the sidechain. Furthermore, for sidechains, attestations on the occurrence of an off-chain event can be mined to either the mainchain or the sidechain—in some cases, whether attestations are sent to the mainchain or the sidechain may be based on determining whether the mainchain or the sidechain would have faster and more regular block generation. Advantages of faster and more regular block generation may include less time being taken for blocks to be confirmed. Additionally, it should be noted that in various embodiments which utilize ghost chains to construct a decryption key, the attestations may be sent to the mainchain and the ghost chain may be instantiated in response to sufficient attestations being observed.

Figure 14:
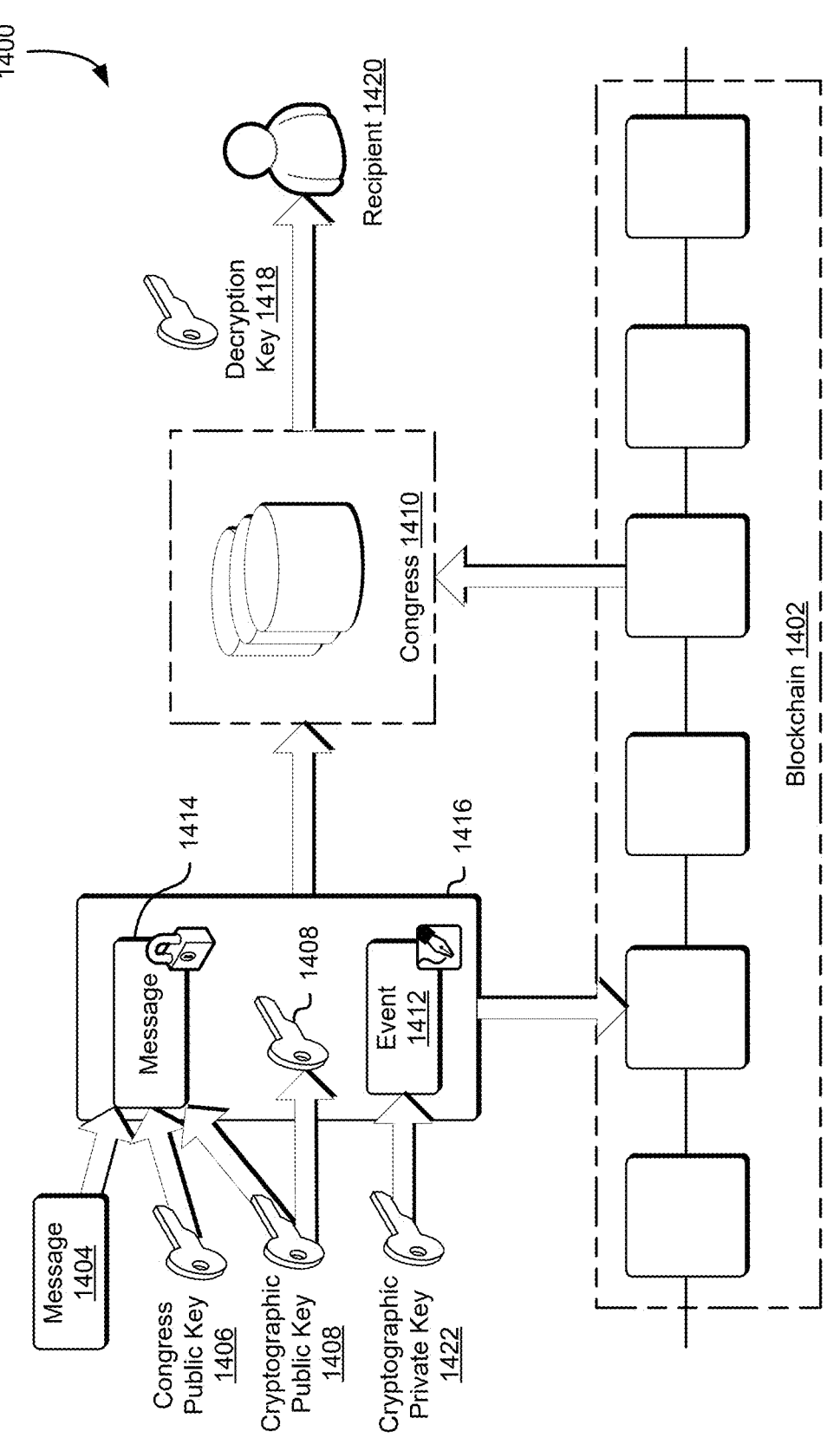
FIG. 14 is a block diagram of an example blockchain and an event-locked message.

Referring now to FIG. 14, a diagram 1400 illustrates a blockchain 1402 that may be utilized to perform various techniques of this disclosure. In some embodiments, the blockchain 902 is a block-based distributed proof-of-work ledger.

In some embodiments, a message 1404 may include data, information, and the like, which may be in a digital form and which a sender encrypts under an event-lock encryption scheme so that the message is rendered decryptable and/or decrypted upon the occurrence of an event. The message 1404 may be encrypted to a cryptographic public key 1408 in accordance with an identity-based encryption scheme which utilizes the congress public key 1406. The cryptographic public key 1408 may have a corresponding cryptographic private key 1422 that is accessible to the entity generating the event-locked message. The congress public key 1406 may be an asymmetric public key that is associated with the congress 1410 shown in FIG. 14. The congress 1410 shown in FIG. 14 may be in accordance with congresses described elsewhere in this disclosure. The congress may be utilized to verify the occurrence of on-chain and off-chain events. The message 1404 may be encrypted to the cryptographic public key 1408 in accordance with an identity-based encryption scheme that utilizes the congress public key 1406, thereby generating an encrypted message 1414.

A transaction 1416 may be broadcasted to a blockchain 1402 and the transaction may include the encrypted message 1414, the sender public key 1408, and an event 1412. The transaction may be a flagged transaction that contains, as metadata, an identifier which enables it to be recognised as a transaction serving a particular purpose. The event 1412 may be an event or condition which, when satisfied, indicates that the encrypted message 1414 should be made decryptable. The event 1412 may be an on-chain event or an off-chain event, or any combination thereof. The event may be in accordance with on-chain and off-chain events described elsewhere in this disclosure. The event 1412 may be encoded in various formats, such as expression as a predicate which may be evaluated to a TRUE or FALSE statement. For example, the event 1412 may be the passage of a specified amount of time, after which the encrypted message 1414 should be decryptable by a recipient 1420. The event 1412 may be digitally signed by the entity that encrypts the message. The digital signature may be generated using a sender private key 1422 that is an asymmetric private key that corresponds to the sender public key 1408 used to generate the encrypted message 1414. The sender public key 1408 may be included in the transaction 1416 and may be utilized to cryptographically verify that digital signature generated over the event 1412 is authentic. In some embodiments, the transaction 1416 also includes a fee. The fee may be a transfer of digital assets to the address associated to a public group address of the congress 1410. The fee may be distributed among members of the congress that cooperate and participate in performing an event-lock decryption of the encrypted message. Methods and processes for generating an event-locked message are described in more detail in connection with FIG. 15 below.

When a member of the congress 1410 detects that the event has been satisfied, a ghost chain may be deployed to construct the decryption key. The ghost chain may be in accordance with those described elsewhere in this disclosure, such as those discussed in connection with FIGS. 9 to 13. The ghost chain may be instantiated after a node (e.g., a member of a congress) determines that an event has occurred indicating that an event-locked encrypted message should be decrypted. The ghost chain 904 may be instantiated with a genesis block that is the final block from a previous instantiation of the ghost chain. A number of blocks are added to the ghost chain by miners to facilitate the construction of the decryption key.

When the decryption key is constructed, a transaction may be constructed and signed on the ghost chain. The transaction may be a transaction whose effect will be to distribute funds on the main blockchain 902—for example, nodes that participate in the mining of the ghost chain may be paid to perform one or more operations upon determining the event has occurred (e.g., constructing and/or distributing a decryption key 1418). In some cases, the decryption key 1418 may be made available to one or more particular parties. For example, consider the case where the encrypted message should be made decryptable only to an intended recipient. TEEs belonging to the members of the congress 1410 may, upon detecting occurrence of the event, generate respective shares of the decryption key, encrypt those shares with a public key associated with the intended recipient, and include those encrypted shares in a ghost chain. Accordingly, the intended recipient may utilize a corresponding private key to obtain access to the decryption key. The recipient 1420 may refer to an entity or a computing entity on behalf of the entity which receives the decryption key 1418. The decryption key 1418 may be utilized to perform cryptographic operations that enable the recipient 1420 to decrypt the encrypted message 1414 which may be available to the recipient 1420 via the blockchain 1402. In some cases, the recipient may refer to multiple entities, such as a group of users or even the public in general—for example, the decryption key may be published to the mainchain so that anyone may obtain the decryption key and decrypt the encrypted message. Methods and processes for obtaining the decryption key and performing decryptions of encrypted messages using the decryption key are described in greater detail in connection with FIG. 16.

Figure 15:
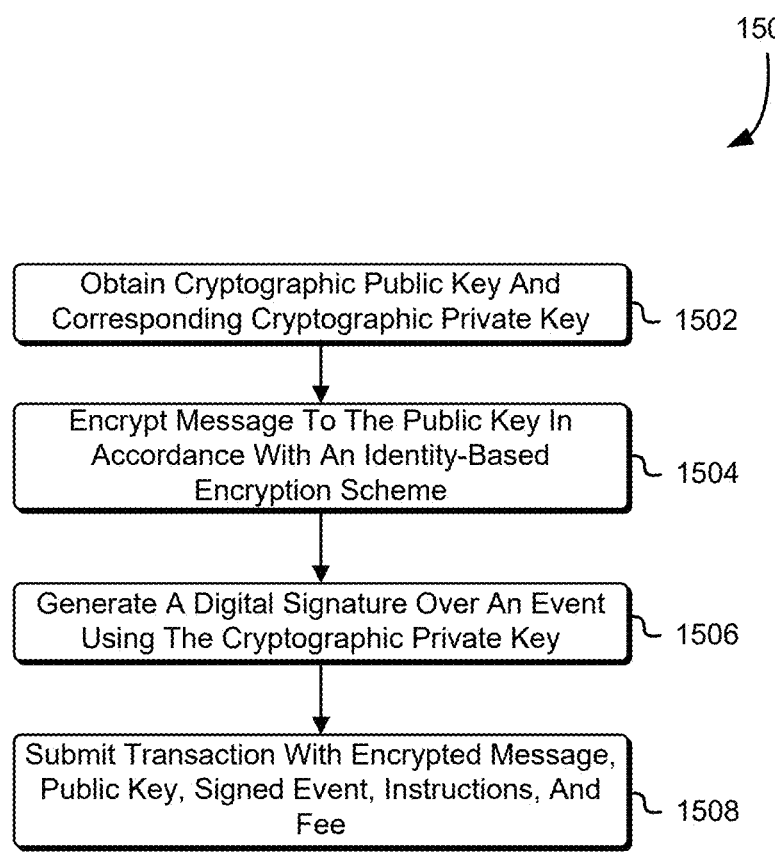
FIG. 15 is a flowchart of an example encryption method for generating an event-locked message.

Referring now to FIG. 15, an example method 1500 of constructing an event-locked message that may be decryptable based on the occurrence of an event. The method 1500 may be performed by any suitable system, such as a computing device running an instance of the blockchain protocol under which a blockchain network 100 operates. The method may be performed by a node 104. The method may, for example, be used to implement techniques for performing time-lock encryption where a message is encrypted and, upon a specified time being reach or passed, the encrypted message becomes decryptable and/or decrypted.

The system may obtain 1502 a cryptographic public key and a corresponding cryptographic private key. The system may encrypt 1504 a message to the cryptographic public key in accordance with an identity-based encryption scheme such as the Boneh-Franklin identity-based encryption scheme. The encryption may be performed in accordance with techniques described by Boneh and Franklin in "Identity-based encryption from the Weil pairing." The encryption may be performed using elliptic curve cryptography such as in the manner described below. The result of encrypting the message may be that an encrypted message or ciphertext is generated.

The system may also generate 1506 a digital signature over an event that specifies one or more conditions of the decryption. The conditions may, for example, indicate a time when the decryption should occur (e.g., in time-lock encryption). In some cases, the conditions could also specify whether or not the contributions to the decryption key should be encrypted before being output by the TEE, and if so, the set of keys that should be used for the encryptions. The transaction comprising the contribution to the decryption key may be digitally signed using the cryptographic private key corresponding to the cryptographic public key utilized to encrypt the message in accordance with an identity-based encryption scheme. Authenticity of the digital signature may be cryptographically verifiable using the cryptographic public key, which may be submitted as part of a transaction to a proof-of-work network. In some embodiments, the digital signature may be generated over additional data such as a nonce.

In some embodiments, the system submits 1506 one or more transactions to a proof-of-work blockchain network that includes the encrypted message, the public key that the message was encrypted to, an event that indicates a condition upon which the encrypted message should be decrypted and a corresponding digital signature over at least the event, and a fee. The event may be an on-chain event or an off-chain event such that a congress 110 can reach a consensus as to whether the event has occurred. In the case of an off-chain event, the decryption may occur in response to consensus that a threshold number of attestations to the event's occurrence have been observed. There may be additional conditions for the decryption to occur, such as requiring that the threshold be maintained for a certain length of time (e.g., in systems where retractions are possible). The conditions may be specified by the requestor and may be encoded in the one or more transactions described above. For example, in the case of time-lock encryption, the event may be the passage of a (possibly random) amount of time, which may be determinable and verifiable using on-chain information. The fee may be a transfer of digital assets to the address associated to a public group address of a congress 110. The fee may be distributed among members of the congress that cooperate and participate in performing an event-lock decryption of the encrypted message. In some cases, the one or more transactions may indicate that one or more operations should be performed either in addition to or in place of decryption.

In some embodiments, the method 1500 may be implemented in accordance with an id-based threshold scheme such as those described in Boneh and Franklin in "Identity-based encryption from the Weil pairing" and provide improved efficiency and reliability using techniques described in connection with the method 1500 and techniques elsewhere in this disclosure. In some embodiments, the method 1500 may assume there exists $G_1$ and $G_2$ with a bilinear mapping e: $G_1 \times G_1 \rightarrow G_2$ and P a generator of $G_1$. In an embodiment, $G_1$ and $G_2$ are both finite cyclic groups of the same prime order q and the discrete logarithm problem is assumed to be hard on $G_1$ and $G_2$. Further assume a congress public key $P_{pub}$ and a corresponding private key $$s \in_R Z_q^*,$$

that is, s is drawn at random from the set $\{1, 2, \ldots, q\}$ such that $P_{pub}=s \times P$. The system (e.g., on behalf of a user) requesting performance of the event-lock encryption may specify a public key A that has a corresponding private key that the system has access to. The encryption function to encrypt a message m to a public key A may therefore be:

$$Enc(P_{pub}, A, m) = (rP, m \oplus H_2(g_A^r)), \text{ where } r \in_R Z_q^*$$

$$g_A = e(Q_A, P_{pub})$$

$$Q_A = H_1(A)$$

$$H_1: \{0, 1\}^* \to G_1, \text{ a random oracle}$$

$$H_2: G_2 \to \{0, 1\}^*, \text{ a random oracle.}$$

Accordingly, a ciphertext c=(u, v) may be generated.

Figure 16:
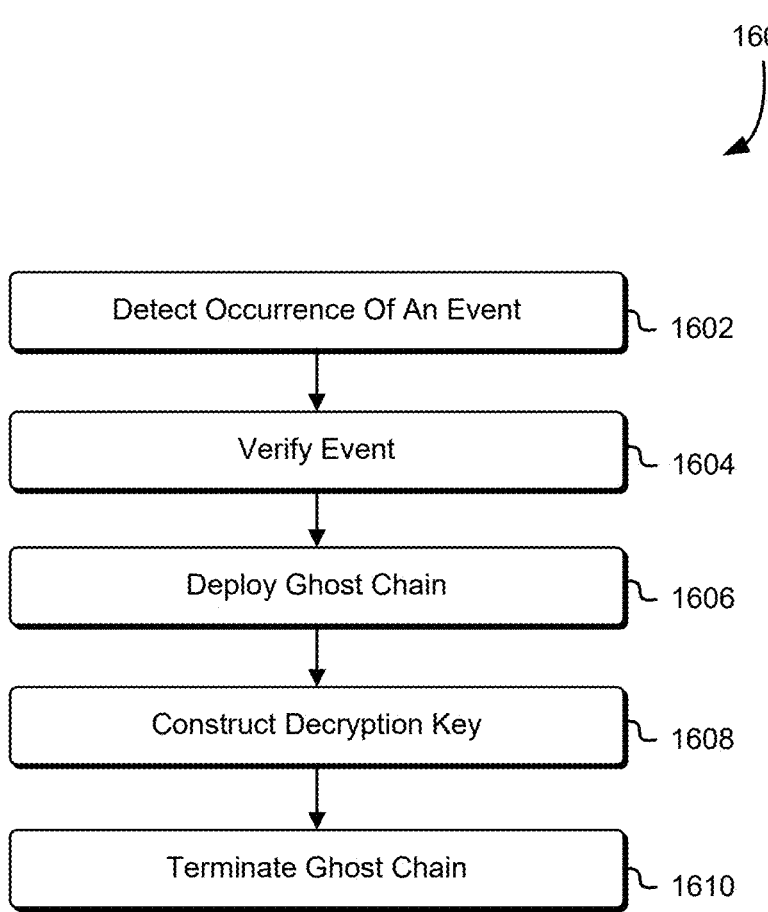
FIG. 16 is a flowchart of an example method for performing steps in response to detecting an event specified in an event-locked message and generating a decryption key usable to decrypt the event-locked message.

Referring now to FIG. 16, an example method 1600 of an event-lock decryption. The method 1600 of FIG. 16 may be performed by one or more computer systems such as nodes of a congress in cooperation. The method 1600 may be performed at some point after a transaction as described in connection with FIG. 15 is transmitted and confirmed on a blockchain network. One or more transactions may include an encrypted message, a cryptographic key such as a public key that is associated with an intended recipient, and so on. For example, a first transaction may include the encrypted message, the cryptographic key, an event or condition that indicates when the encrypted message should be made decryptable and a second transaction may include a fee to the congress that may be distributed in connection with the generation of the decryption key upon occurrence of the event or condition specified in the first transaction.

A system such as a member of a congress, or more generally, a node of a blockchain network, may detect 1602 the occurrence of an event in connection with a transaction as discussed above. The event may be an on-chain event or an off-chain event. For on-chain events, the TEEs will utilise the key-shares held inside to contribute to construction of the decryption key when they observe the required event in the blockchain. In some cases, the on-chain event should be observed in a confirmed transaction. For off-chain events, consensus may be reached on an on-chain event which is believed to be a reliable indicator that the off-chain event has actually occurred. For example, the corresponding on-chain event may be that a threshold of congress members have signalled, by sending certain flagged transactions to the blockchain, that they believe the off-chain event to have occurred. In some cases, these signals may be retracted if congress members later determine that the off-chain event has not occurred (e.g., a node may, at a later time and/or based on additional information, determine that the off-chain event has not actually occurred)—in such systems, reaching a consensus may further require that the flagged transactions remain un-retracted for a given period of time.

As an alternative method for determining whether an off-chain event has occurred, a node may submit an indication that the event occurred and include a deposit of digital assets. The deposit may be returned in the case that the congress determines the event occurred (as well as a payment of at least part of a fee that was deposited as remuneration for decrypting the event-locked message) and may be confiscated in the case that the congress determines that the event did not occur. In some cases, the solution provided by the node may be challenged, and a resolution as to whether the off-chain event occurred may be determined by having members of the congress vote as to the whether to accept that the event has occurred or not occurred.

A transaction such as those described in connection with FIG. 15 may include an encrypted message, a public key A that the message is encrypted to in accordance with an identity-based encryption scheme, and a digitally signed event. Validity of the digital signature over the event may be verified 1604 using public key A. In some cases, construction of the decryption key by the ghost chain may be contingent upon the digital signature being valid. In a time-lock encryption scheme, the event may be a timestamp that indicates when the encrypted message should be made decryptable. Verifying authenticity of the digital signature over the timestamp ensures that an entity without access to the private signing key SkA corresponding to the public key A cannot prematurely trigger the decryption key to be constructed. By generating a digital signature that is cryptographically verifiable with public key A included in the transaction, an adversary will be unable to induce the congress to release the decryption key prematurely, for example, by 'front running' the transaction with another transaction containing an earlier decryption time and an arbitrary ciphertext encrypted to the public key A. By requiring the transaction to contain a valid signature, a 'front running' attack will not be possible since the congress will not proceed unless the transaction includes a valid digital signature generated using a private signing key SkA that corresponds to the public key A.

A ghost chain may be deployed 1606, a genesis block for the ghost chain may be created or obtained by the members of the congress in cooperation with other nodes of the group. The genesis block may be a final block from the previous ghost chain deployment (e.g., the terminal block from the last instance that a ghost chain was run and the previous run may have been in response to, for example, a past challenge or a previous event-lock decryption). This block may contain information regarding genesis payments. Genesis payments are transfers of digital assets, which are yet to be made that are due based on a previous deployment of the ghost chain. The ghost chain may be deployed using techniques described elsewhere such as in connection with FIG. 13.

Upon a consensus among a group holding at least a threshold of private key shares, nodes of the congress may construct 1608 a decryption key that may be used to decrypt the encrypted message. The decryption key may be constructed by inclusion of the necessary quantities into the ghost chain blocks. For example, this can be achieved by sending the quantities to the ghost chain via transactions or by mining them directly into the ghost chain as discussed above. For example, in accordance with a scheme based on pairs on elliptic curves, the decryption key dA=sQA where QA is derivable from the cryptographic key utilized in the encryption of the message and the decryption key is derivable by the cooperation of at least a threshold number of private key share holders (i.e., the members of the congress) in accordance with a threshold secret sharing scheme.

In some embodiments, the decryption key may be made available to the public by publishing the decryption key to the main blockchain in a plaintext format. In some cases, the decryption key may be made accessible only to a group holding a given set of private keys. For example, in some systems, an event-locked message can be made decryptable by the holders of a set of private keys corresponding to a set S of public keys. In one example, each contribution to the decryption key is encrypted using each of the set S of public keys before it is output by the TEE and these encryptions are sent to the blockchain. As a second example for how a ciphertext can be made decryptable by the holders of a set of private keys corresponding to a set S of public keys, after the transaction including the event-locked message is observed to have been confirmed, a signing key SkA may be encrypted using each public key from the set S of public keys and distributed to the individual owners of the private keys corresponding to the set S of public keys (for example, these encryptions could be mined into the blockchain, being included in another transaction). Furthermore, the transaction including the event-locked message may stipulate that the contributions to the decryption key dA should be encrypted using the public key A (i.e., the public key corresponding to the signing key SkA) before being output by the TEE and sent to the blockchain. When this is completed, the recipients of the encryptions of the signing key SkA will be able to construct the decryption key.

The ghost chain terminates 1610. That is, upon completion of the task (e.g., construction of the decryption key) the ghost chain terminates. When the ghost chain is terminated, the decryption key may be recorded to the proof-of-work blockchain network. The ghost chain may be terminated using techniques described elsewhere such as in connection with FIG. 13.

Continuing with the previous example discussed in connection with FIG. 15, the decryption function to decrypt a ciphertext c=(u, v) corresponding to the encrypted message described above. A secret key may be derived as $d_A=SQ_A$, with $Q_A$ defined as above $Q_A=H_1(A)$. The decryption function to decrypt the ciphertext c may therefore be:

$$Dec(u, v, d_A) = v \oplus H_2(e(d_A, u))$$

$$Dec(u, v, d_A) = v \oplus H_2(e(sH_1(A), rP))$$

$$Dec(u, v, d_A) = v \oplus H_2(e(H_1(A), P)^{rs})$$

$$Dec(u, v, d_A) = v \oplus H_2(e(Q_A, sP)^r)$$

$$Dec(u, v, d_A) = v \oplus H_2(e(Q_A, P_{pub})^r)$$

$$Dec(u, v, d_A) = v \oplus H_2(g_A^r)$$

$$Dec(u, v, d_A) = (m \oplus H_2(g_A^r)) \oplus H_2(g_A^r)$$

$$Dec(u, v, d_A) = m$$

As noted by Boneh and Franklin in "Identity-based encryption from the Weil pairing," the above leads to a particularly efficient threshold decryption scheme: decryption of the ciphertext c=(u, v) can be achieved by a threshold of participants, each holding a share $s_i$ in the system-wide secret key, by broadcasting $e(s_iQ_A, u)$. Then, it follows from the basic property of the mapping $$\prod_i e(s_iQ_A, u)^{L_i} = e\left(\sum_i L_is_iQ_A, u\right) = e(d_A, u)$$

where $L_i$ are the appropriate Lagrange coefficients. $e(d_A, u)$ may now be inserted in the second line of the Dec(u, v, $d_A$) operation, above.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising"

means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A method for updating private key share distribution, the method comprising:

in response to a change of a membership of a group of nodes comprising a congress:

detecting a redistribution request to redistribute key shares amongst a new group of nodes;

generating a new private key share for each of the nodes in the new group of nodes; and transferring digital assets from a public address associated with the previous group of nodes to a new public address associated with the new group of nodes and a new public key.

2. The method of claim 1, wherein the new private key shares are to be used in a threshold signature scheme in which at least a threshold of private key shares must be used to generate a valid signature for a transaction on behalf of the congress comprising the new group of nodes.

3. The method of claim 1, wherein generating the private key shares comprises generating a random polynomial of order t with a constant term $$\text{zero } f_{n+1}^0(x);$$

calculating a point $$f_{n+1}^0(n + 1)$$

and sewing unis as a private key share of a first node of the new group of nodes.

4. The method of claim 3, further comprising distributing points on this polynomial $$f_{n+1}^0(i)$$

to each of the congress members in the new group of nodes, i=1, . . . , n.

5. The method of claim 4, wherein each congress member (i=1, . . . , n) adds the received value to their existing private key share to obtain the new private key share.

6. The method of claim 1, wherein the redistribution request is detected when a prospective new member has transferred digital assets into a public group address.

7. The method of claim 6, wherein the redistribution request is detected when an existing member of the previous group of nodes requests withdrawal of a member deposit.

8. The method of claim 7, further comprising, in response to receiving the request, evaluating the request against determined criteria.

9. The method of claim 8, further comprising facilitating withdrawal of the member deposit, wherein the withdrawal is facilitated in accordance with a threshold signature scheme so that the withdrawal is only effected if at least a threshold number of congress members authorize the withdrawal.

10. The method of claim 9, further comprising performing the withdrawal after the member who desires to disenroll is suspended from activity for a period of time.

11. The method of claim 1, wherein when the redistribution request is detected, identifying members of the previous group comprising the congress using one or more attributes in at least some transactions of digital assets to a public group address.

12. A computer readable storage medium comprising computer-executable instructions which, when executed, configure a processor to perform a method in response to a change of a membership of a group of nodes comprising a congress, the method comprising:

detecting a redistribution request to redistribute key shares amongst a new group of nodes;

generating a new private key share for each of the nodes in the new group of nodes; and transferring digital assets from a public address associated with the previous group of nodes to a new public address associated with the new group of nodes and a new public key.

13. An electronic device comprising:

an interface device;

a processor coupled to the interface device;

a memory coupled to the processor, the memory having stored thereon computer executable instructions which, when executed, configure the processor to perform a method in response to a change of a membership of a group of nodes comprising a congress, the method comprising:

detecting a redistribution request to redistribute key shares amongst a new group of nodes;

generating a new private key share for each of the nodes in the new group of nodes; and transferring digital assets from a public address associated with the previous group of nodes to a new public address associated with the new group of nodes and a new public key.

14. The electronic device of claim 13, wherein the processor includes a trusted execution environment and wherein the computer executable instructions are executed within the trusted execution environment.

15. The electronic device of claim 13, wherein the new private key shares are to be used in a threshold signature scheme in which at least a threshold of private key shares must be used to generate a valid signature for a transaction on behalf of the congress comprising the new group of nodes.

16. The electronic device of claim 13, wherein generating the private key shares comprises generating a random polynomial of order t with a constant term zero $$f_{n+1}^0(x);$$

calculating a point $$f_{n+1}^0(n+1)$$

and setting this as a private key share of a first node of the new group of nodes; and distributing points on this polynomial $$f_{n+1}^0(i)$$

to each of the congress members in the new group of nodes, $i=1, \ldots, n$.

17. The electronic device of claim 16, wherein each congress member $(i=1, \ldots, n)$ adds the received value to their existing private key share to obtain the new private key share.

18. The electronic device of claim 13, wherein the redistribution request is detected when a prospective new member has transferred digital assets into a public group address.

19. The electronic device of claim 18, wherein the redistribution request is detected when an existing member of the previous group of nodes requests withdrawal of a member deposit, in response to receiving the request, evaluating the request against determined criteria; and facilitating withdrawal of the member deposit, wherein the withdrawal is facilitated in accordance with a threshold signature scheme so that the withdrawal is only effected if at least a threshold number of congress members authorize the withdrawal.

20. The electronic device of claim 13, wherein when the redistribution request is detected, identifying members of the previous group comprising the congress using one or more attributes in at least some transactions of digital assets to a public group address.

*   *   *   *   *